(12) United States Patent
Umeda et al.

(10) Patent No.: US 8,779,643 B2
(45) Date of Patent: *Jul. 15, 2014

(54) STATOR FOR ELECTRIC ROTATING MACHINE AND METHOD OF MANUFACTURING SAME

(75) Inventors: Atsushi Umeda, Okazaki (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 618 days.

This patent is subject to a terminal disclaimer.

(21) Appl. No.: 12/837,724

(22) Filed: Jul. 16, 2010

(65) Prior Publication Data

US 2011/0012472 A1 Jan. 20, 2011

(30) Foreign Application Priority Data

| Jul. 17, 2009 | (JP) | 2009-169468 |
| Oct. 20, 2009 | (JP) | 2009-241781 |
| Jun. 15, 2010 | (JP) | 2010-135842 |

(51) Int. Cl.
  *H02K 3/28* (2006.01)
  *H02K 3/04* (2006.01)

(52) U.S. Cl.
  USPC .......................................... 310/207; 310/184

(58) Field of Classification Search
  USPC ....................................................... 310/207
  See application file for complete search history.

(56) References Cited

U.S. PATENT DOCUMENTS

| 6,707,215 B2 * | 3/2004 | Nishimura .................... 310/201 |
| 6,715,199 B2 * | 4/2004 | Kusumoto et al. ............. 29/596 |
| 6,882,077 B2 | 4/2005 | Neet |
| 6,885,124 B2 | 4/2005 | Neet |
| 8,193,675 B2 * | 6/2012 | Ishizuka et al. ............... 310/201 |
| 8,264,115 B2 * | 9/2012 | Nakamura .................... 310/201 |
| 8,397,368 B2 * | 3/2013 | Akimoto et al. ............... 29/596 |

(Continued)

FOREIGN PATENT DOCUMENTS

| CN | 1531167 | 9/2004 |
| CN | 101478184 | 7/2009 |

(Continued)

OTHER PUBLICATIONS

Chinese Office Action dated May 14, 2012, issued in corresponding Chinese Application No. 201010272504.0 with English translation.

(Continued)

*Primary Examiner* — Burton Mullins
(74) *Attorney, Agent, or Firm* — Nixon & Vanderhye PC

(57) ABSTRACT

A stator includes a stator core and a stator coil comprised of a plurality of electric wires. Each of the electric wires has, at least, first, second, and third in-slot portions and first and second turn portions. The first to third in-slot portions are respectively received in three different slots of the stator core. The first turn portion is located on one axial side of the stator core outside of the slots to connect the first and second in-slot portions. The second turn portion is located on the other axial side of the stator core outside of the slots to connect the second and third in-slot portions. For each of the electric wires, the radial distances of the first to third in-slot portions from the axis of the stator core successively decrease. All of the electric wires are offset from one another in the circumferential direction of the stator core.

17 Claims, 23 Drawing Sheets

(56) References Cited

U.S. PATENT DOCUMENTS

| | | |
|---|---|---|
| 8,450,899 B2 * | 5/2013 | Umeda et al. ............ 310/195 |
| 2004/0040142 A1 | 3/2004 | Hirota et al. |
| 2004/0119362 A1 | 6/2004 | Neet |
| 2004/0263016 A1 | 12/2004 | Neet |
| 2007/0182267 A1 * | 8/2007 | Neet ............ 310/180 |
| 2009/0140594 A1 * | 6/2009 | Ogawa et al. ............ 310/195 |
| 2010/0141078 A1 | 6/2010 | Kouda et al. |
| 2010/0148621 A1 | 6/2010 | Ishizuka et al. |
| 2012/0007462 A1 | 1/2012 | Kouda et al. |

FOREIGN PATENT DOCUMENTS

| | | | | |
|---|---|---|---|---|
| JP | 2000-069701 | 3/2000 | | |
| JP | 2004-104841 | 4/2004 | | |
| JP | 4105111 | 4/2008 | | |
| JP | 2009-112186 | 5/2009 | | |
| WO | 2008/108351 | * 9/2008 | ............ | H02K 3/04 |

OTHER PUBLICATIONS

Chinese Official Action issued for Chinese Patent Application No. 201010272504.0, dated Aug. 12, 2013 (with partial English translation).

Japanese Office Action issued for Japanese Patent Application No. 2010-135842, dated Jan. 7, 2014, with partial English translation (5 pages).

* cited by examiner

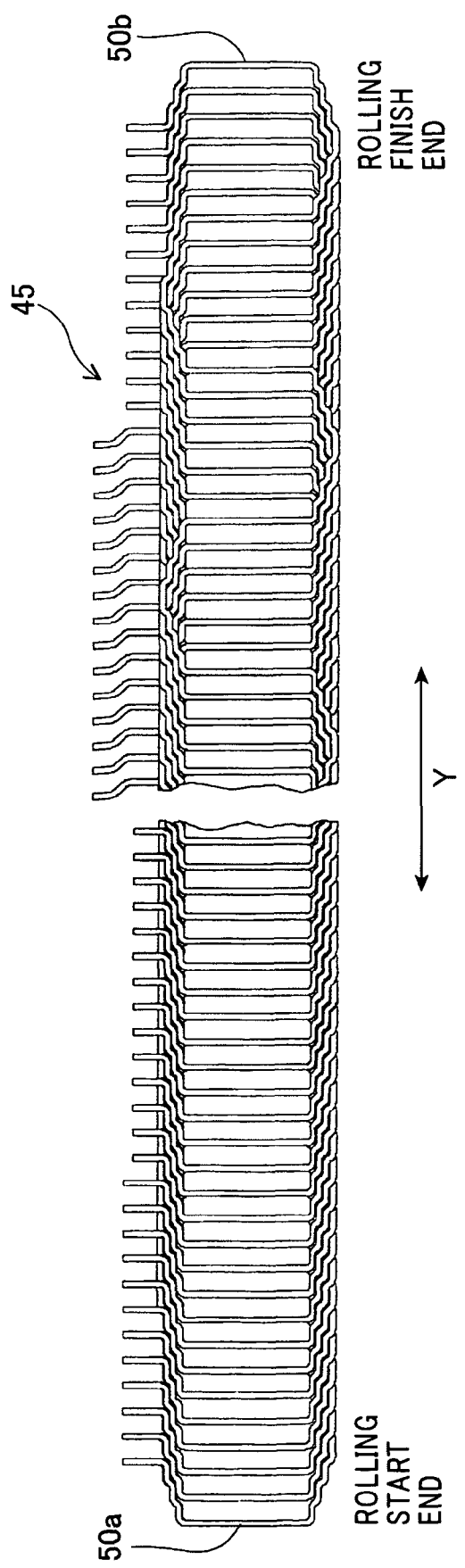

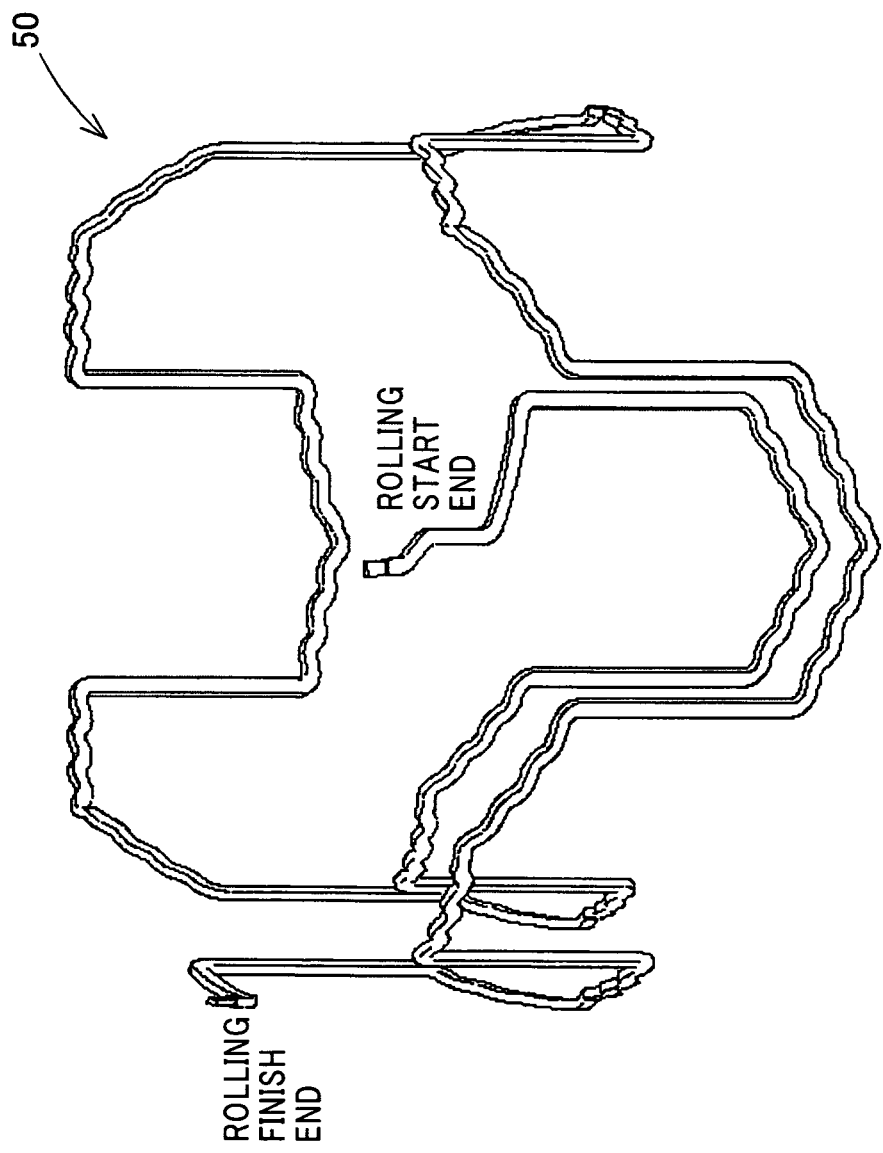

FIG.17

| SLOT NUMBER | OUTERMOST LAYER | INNERMOST LAYER |
|---|---|---|
| 1 | U1-1 | U1-3' |
| 2 | U2-1 | U2-3' |
| 3 | W1-1' | W1-3 |
| 4 | W2-1' | W2-3 |
| 5 | V1-1 | V1-3' |
| 6 | V2-1 | V2-3' |
| 7 | U1-1' | U1-4 |
| 8 | U2-1' | U2-4 |
| 9 | W1-1 | W1-4' |
| 10 | W2-1 | W2-4' |
| 11 | V1-1' | V1-4 |
| 12 | V2-1' | V2-4 |
| 13 | U1-2 | U1-4' |
| 14 | U2-2 | U2-4' |
| 15 | W1-2' | W1-4 |
| 16 | W2-2' | W2-4 |
| 17 | V1-2 | V1-4' |
| 18 | V2-2 | V2-4' |
| 19 | U1-2' | U1-1 |
| 20 | U2-2' | U2-1 |
| 21 | W1-2 | W1-1' |
| 22 | W2-2 | W2-1' |
| 23 | V1-2' | V1-1 |
| 24 | V2-2' | V2-1 |

| SLOT NUMBER | OUTERMOST LAYER | INNERMOST LAYER |
|---|---|---|
| 25 | U1-3 | U1-1' |
| 26 | U2-3 | U2-1' |
| 27 | W1-3' | W1-1 |
| 28 | W2-3' | W2-1 |
| 29 | V1-3 | V1-1' |
| 30 | V2-3 | V2-1' |
| 31 | U1-3' | U1-2 |
| 32 | U2-3' | U2-2 |
| 33 | W1-3 | W1-2' |
| 34 | W2-3 | W2-2' |
| 35 | V1-3' | V1-2 |
| 36 | V2-3' | V2-2 |
| 37 | U1-4 | U1-2' |
| 38 | U2-4 | U2-2' |
| 39 | W1-4' | W1-2 |
| 40 | W2-4' | W2-2 |
| 41 | V1-4 | V1-2' |
| 42 | V2-4 | V2-2' |
| 43 | U1-4' | U1-3 |
| 44 | U2-4' | U2-3 |
| 45 | W1-4 | W1-3' |
| 46 | W2-4 | W2-3' |
| 47 | V1-4' | V1-3 |
| 48 | V2-4' | V2-3 |

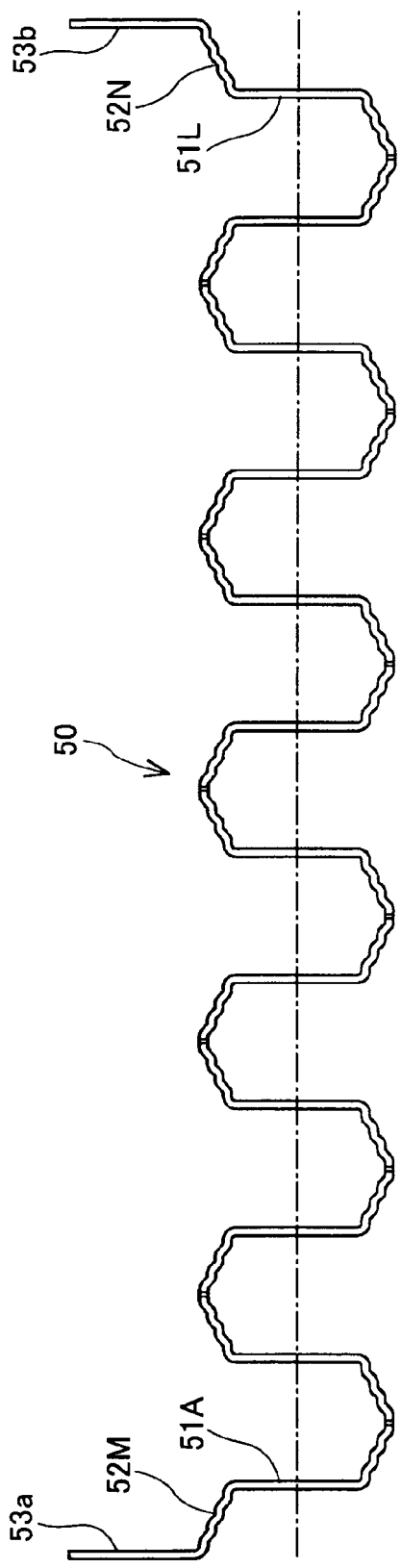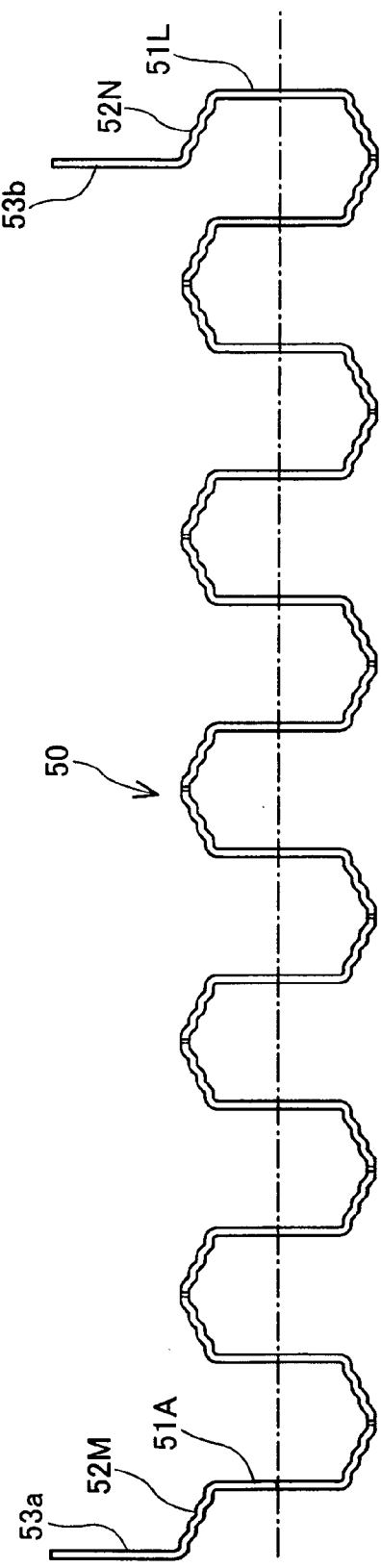

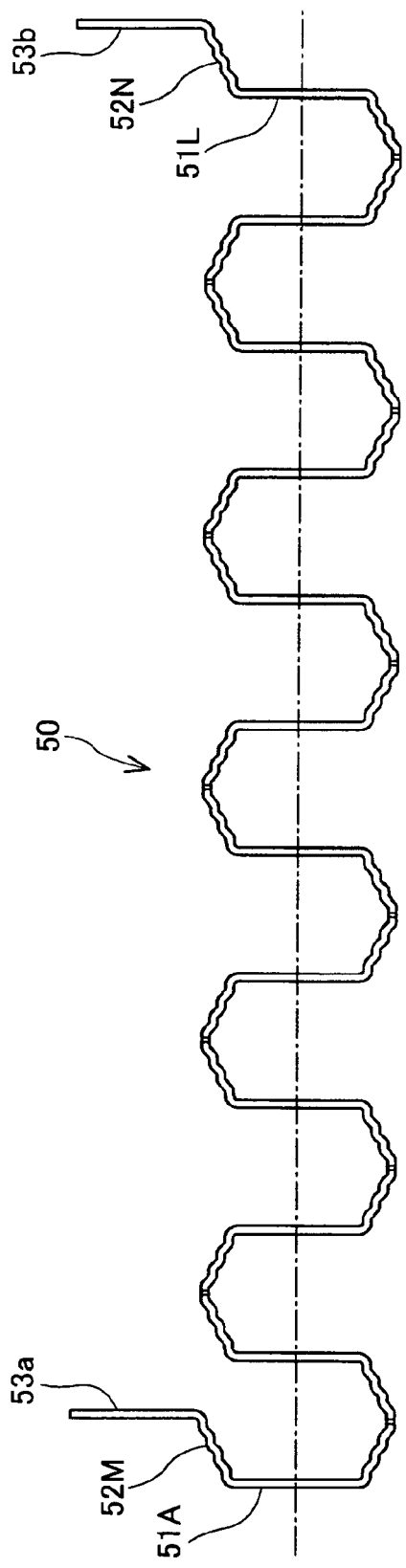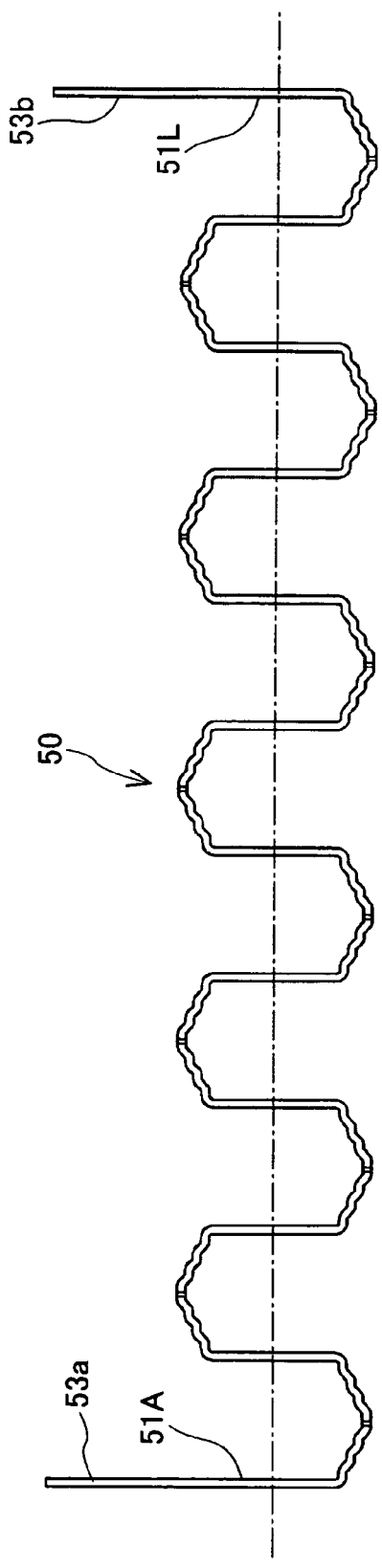

STATOR FOR ELECTRIC ROTATING MACHINE AND METHOD OF MANUFACTURING SAME

CROSS-REFERENCE TO RELATED APPLICATION

This application is based on and claims priority from Japanese Patent Applications No. 2009-169468 filed on Jul. 17, 2009, No. 2009-241781 filed on Oct. 20, 2009, and No. 2010-135842 filed on Jun. 15, 2010, the contents of which are hereby incorporated by reference in their entireties into this application.

BACKGROUND OF THE INVENTION

1 Technical Field of the Invention

The present invention relates to stators for electric rotating machines that are used in, for example, motor vehicles as electric motors and electric generators, and to methods of manufacturing the stators.

2 Description of the Related Art

Conventionally, there are known stators for electric rotating machines which include a hollow cylindrical stator core and a stator coil. The stator core has a plurality of slots that are formed in the radially inner surface of the stator core and spaced in the circumferential direction of the stator core at a predetermined pitch. The stator coil is comprised of a plurality of electric wires mounted on the stator core. Each of the electric wires includes a plurality of in-slot portions, which are received in the slots of the stator core, and a plurality of turn portions that are located outside of the slots to connect the in-slot portions.

Moreover, there is disclosed, for example in Japanese Unexamined Patent Application Publication No. 2004-104841, a method of interlacing a plurality of electric wires (or coil members) to form a stator coil.

According to the method, one electric wire is progressively interlaced with another electric wire by a half turn at a time by repeating the steps of: rotating the electric wire about its axis by 90° and advancing the electric wire toward the another electric wire by a half turn; and rotating the electric wire further about its axis by 90°.

With the above method, however, a lot of time is needed for interlacing the electric wires. Further, in the case of the electric wires each having a large length, a large-scale apparatus is needed for performing the steps for interlacing the electric wires. Consequently, it is difficult to reduce the manufacturing time and cost of the stator coil. Accordingly, with the above method, it is difficult to mass-produce stators at low cost.

SUMMARY OF THE INVENTION

The present invention has been made in view of the above-mentioned problems with the prior art.

According to the present invention, there is provided a stator for an electric rotating machine which includes a hollow cylindrical stator core and a stator coil. The stator core has a longitudinal axis and a plurality of slots that are formed in the radially inner surface of the stator core and spaced in the circumferential direction of the stator core. The stator coil is comprised of a plurality of electric wires mounted on the stator core. Each of the electric wires has, at least, first, second, and third in-slot portions and first and second turn portions. The first, second, and third in-slot portions are respectively received in three different ones of the slots of the stator core. The first turn portion is located on one axial side of the stator core outside of the slots to connect the first and second in-slot portions. The second turn portion is located on the other axial side of the stator core outside of the slots to connect the second and third in-slot portions. Further, for each of the electric wires forming the stator coil, the radial distances from the axis of the stator core to the first, second, and third in-slot portions of the electric wire successively decrease. All of the electric wires are offset from one another in the circumferential direction of the stator core.

With the above configuration of the stator, it is possible to form the stator coil by first stacking the electric wires to form band-shaped electric wire assembly and then rolling the assembly into a hollow cylindrical shape. That is, the stator coil can be formed without performing a process of interlacing the electric wires as disclosed in Japanese Unexamined Patent Application Publication No. 2004-104841. Consequently, it is possible to reduce both the manufacturing time and cost of the stator coil. Accordingly, it is possible to mass-produce stators at low cost.

According to the present invention, there is also provided a method of manufacturing a stator for an electric rotating machine. The stator includes a hollow cylindrical stator core and a stator coil mounted on the stator core. The stator core has a longitudinal axis and a plurality of slots that are formed in the radially inner surface of the stator core and spaced in the circumferential direction of the stator core. The method of manufacturing the stator includes the steps of: (1) shaping a plurality of electric wires into a wave shape so that each of the wave-shaped electric wires includes at least first, second, and third in-slot portions and first and second turn portions, the first, second, and third in-slot portions extending parallel to each other and being to be respectively received in three different ones of the slots of the stator core, the first turn portion connecting the first and second in-slot portions and being to be located on one axial side of the stator core outside of the slots, the second turn portion connecting the second and third in-slot portions and being to be located on the other axial side of the stator core outside of the slots, the first, second, and third in-slot portions being successively offset from one another in a direction perpendicular to both the longitudinal direction of the electric wire and the extending direction of the in-slot portions; (2) stacking the wave-shaped electric wires one by one to form a band-shaped electric wire assembly; (3) rolling the band-shaped electric wire assembly into a hollow cylindrical shape to form the stator coil; and (4) assembling the stator coil with the stator core to form the stator.

With the above method, it is possible to form the stator coil without performing a process of interlacing the electric wires as disclosed in Japanese Unexamined Patent Application Publication No. 2004-104841. Consequently, it is possible to reduce both the manufacturing time and cost of the stator coil. Accordingly, it is possible to mass-produce stators at low cost.

BRIEF DESCRIPTION OF THE DRAWINGS

The present invention will be understood more fully from the detailed description given hereinafter and from the accompanying drawings of one preferred embodiment of the invention, which, however, should not be taken to Limit the invention to the specific embodiment but are for the purpose of explanation and understanding only.

In the accompanying drawings:

FIG. 13B is a front view of the electric wire assembly;

FIG. 13C is a perspective view illustrating one of the electric wires in the electric wire assembly after the electric wire assembly is rolled into a hollow cylindrical shape;

FIG. 17 is a tabular representation showing both the number of the electric wire located at the radially outermost layer and the number of the electric wire located at the radially innermost layer in each of the slots of the stator core;

FIG. 19A is a front view of an electric wire for forming the stator coil according to a first modification of the invention;

FIG. 19B is a front view of an electric wire for forming the stator coil according to a second modification of the invention;

FIG. 20A is a front view of an electric wire for forming the stator coil according to a third modification of the invention;

FIG. 20B is a front view of an electric wire for forming the stator coil according to a fourth modification of the invention;

DESCRIPTION OF PREFERRED EMBODIMENT

One preferred embodiment of the present invention will be described hereinafter with reference to FIGS. 1-18.

Figure 1:
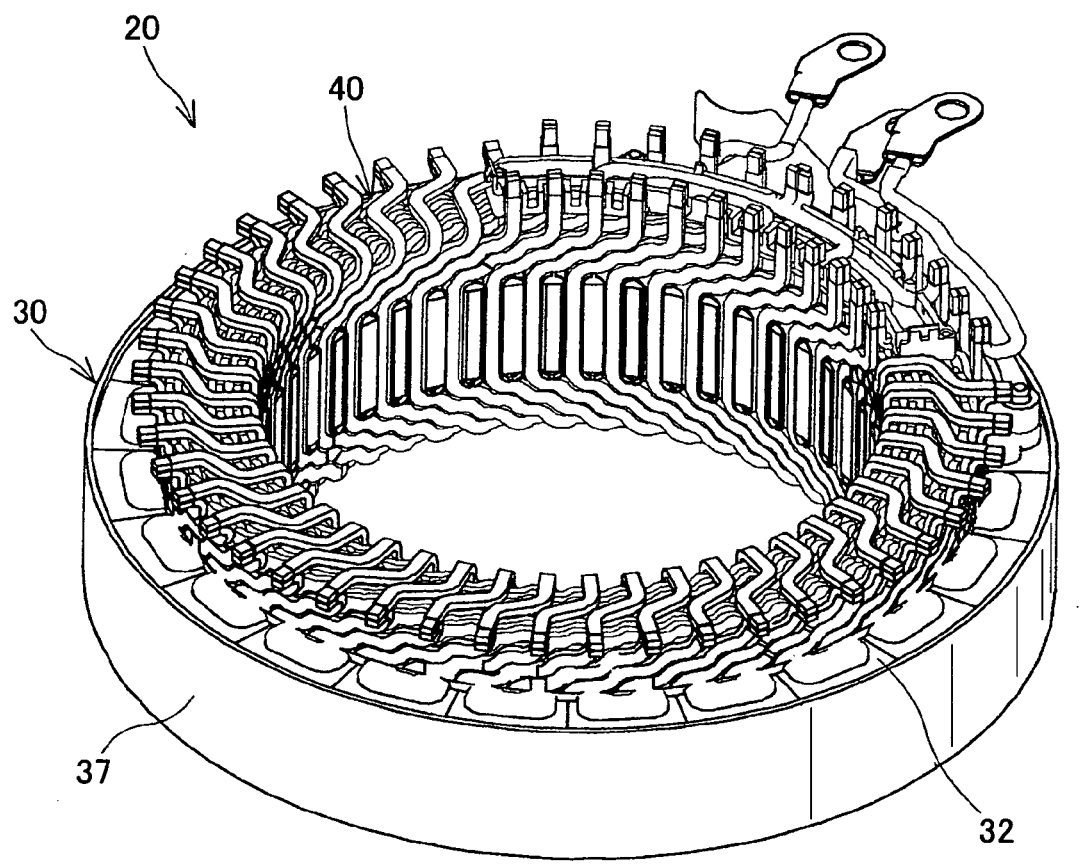
FIG. 1 is a perspective view showing the overall configuration of a stator for an electric rotating machine according to the preferred embodiment of the invention.
Figure 2:
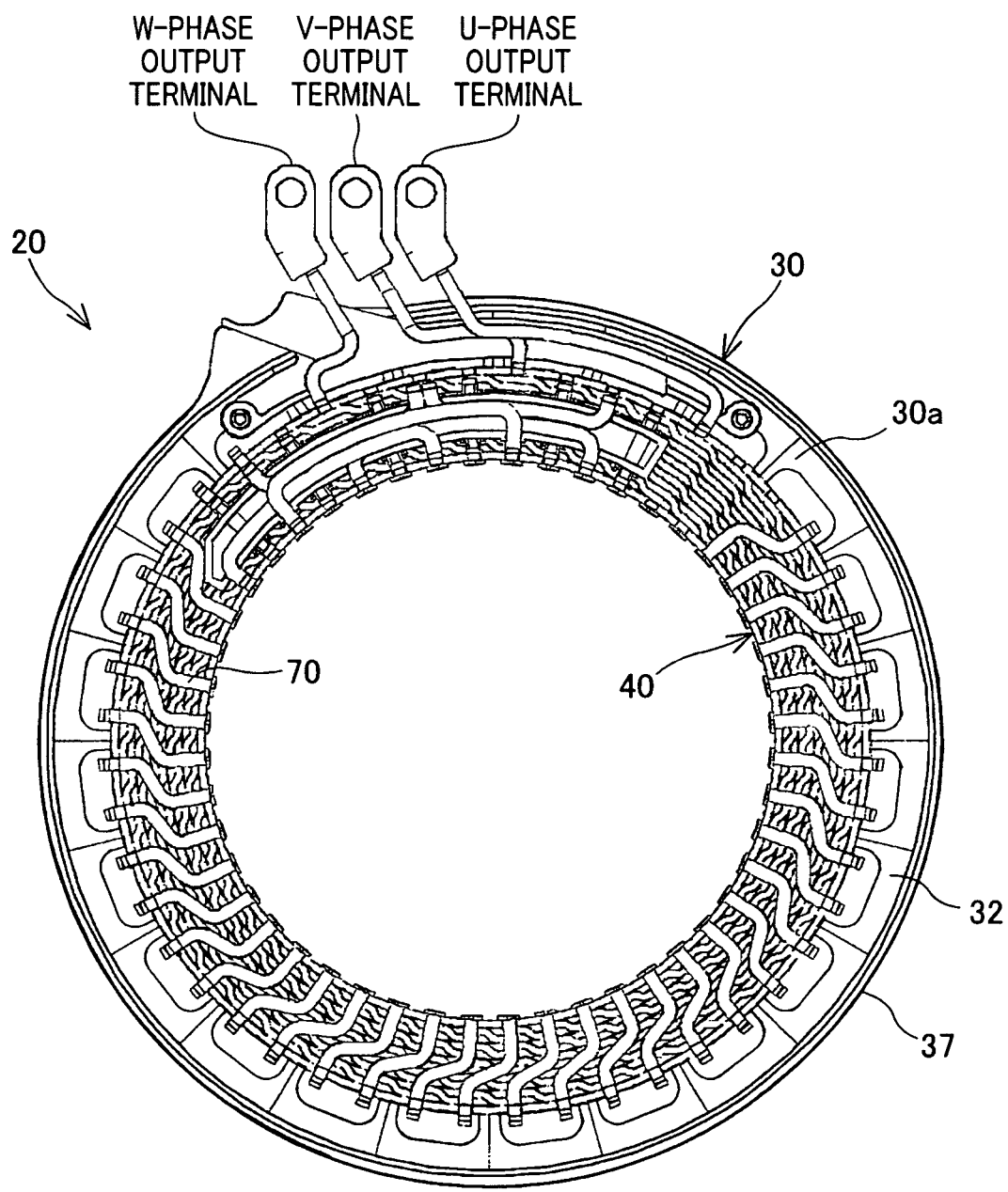
FIG. 2 is a top view of the stator.
Figure 3:
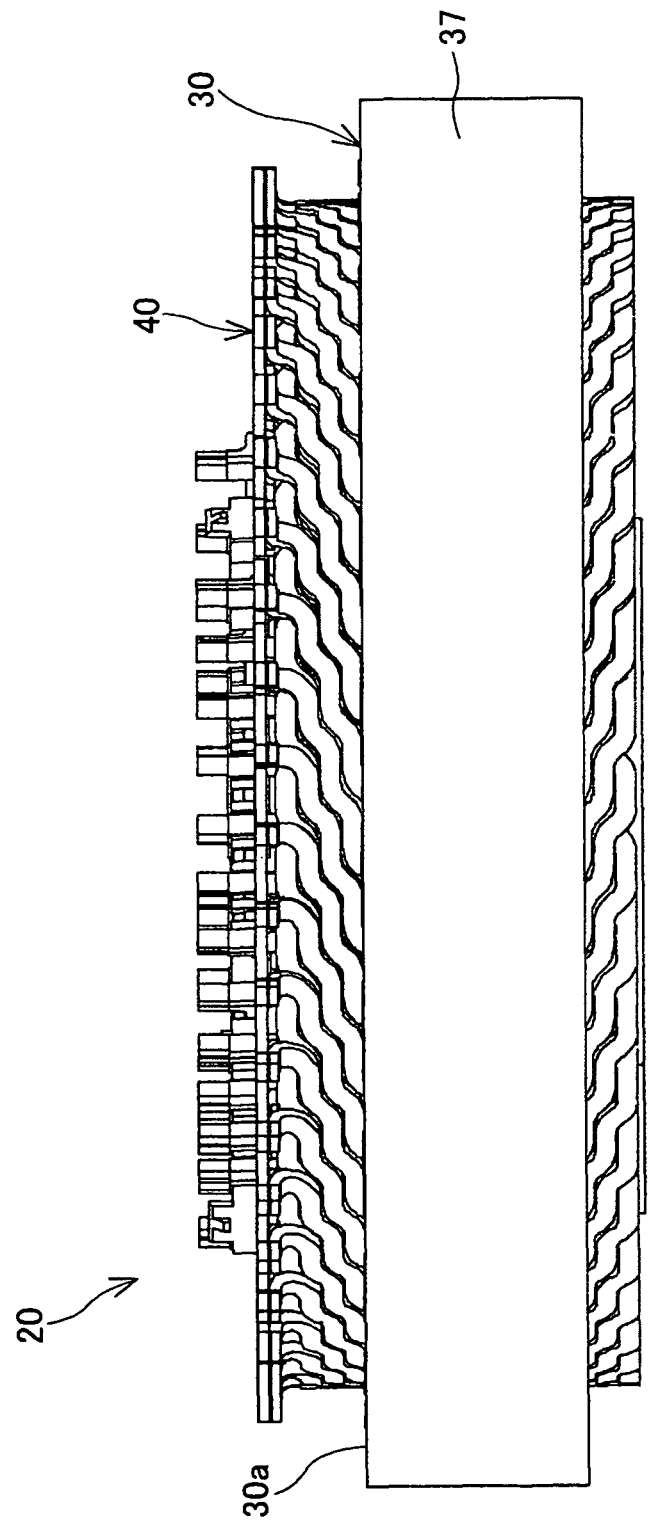
FIG. 3 is a side view of the stator.

FIGS. 1-3 together show the overall configuration of a stator 20 according to a preferred embodiment of the invention. The stator 20 is designed for use in, for example, an electric rotating machine which is configured to function both as an electric motor and as an electric generator in a motor vehicle. The electric rotating machine further includes a rotor (not shown) that is rotatably disposed so as to be surrounded by the stator 20. The rotor includes a plurality of permanent magnets that form a plurality of magnetic poles on a radially outer periphery of the rotor to face a radially inner periphery of the stator. The polarities of the magnetic poles alternate between north and south in the circumferential direction of the rotor. In addition, in the present embodiment, the number of the magnetic poles formed in the rotor is equal to eight four north poles and four south poles).

As shown in FIGS. 1-3, the stator 20 includes a hollow cylindrical stator core 30 and a three-phase stator coil 40 that is comprised of a plurality of (e.g., 48 in the present embodiment) electric wires 50 mounted on the stator core 30. In addition, the stator 20 may further include insulating paper sheets interposed between the stator core 30 and the stator coil 40.

Figure 4:
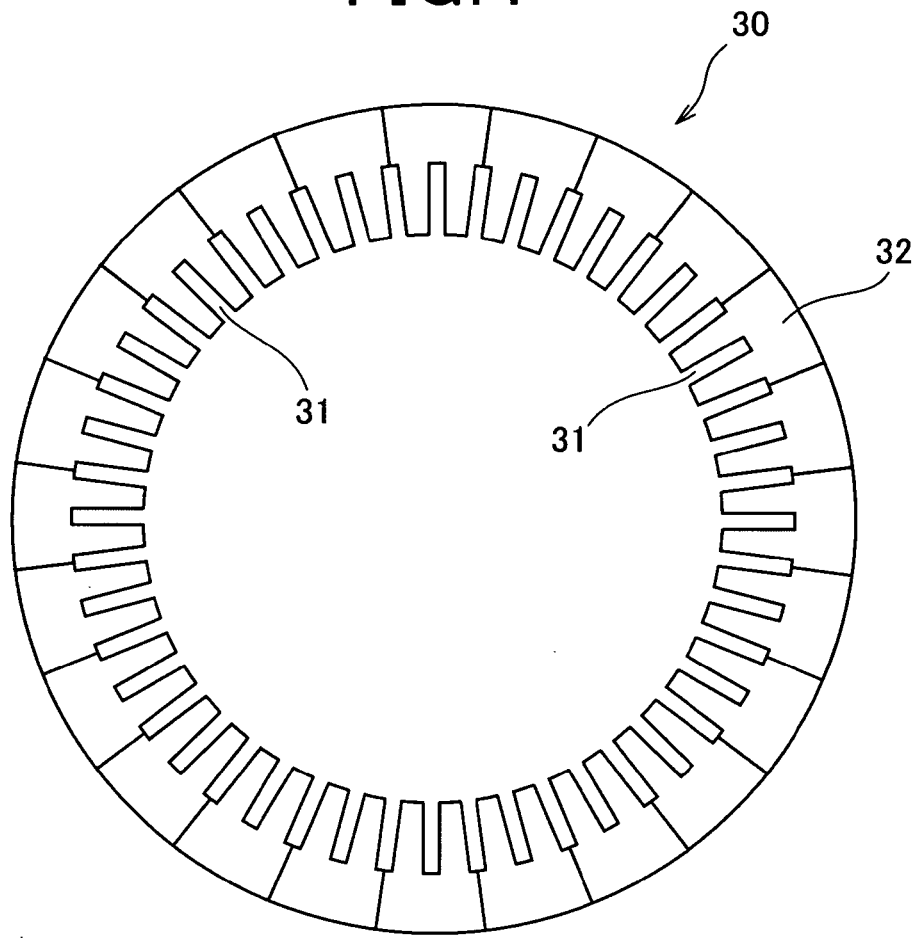
FIG. 4 is a top view of a stator core of the stator.

The stator core 30 has, as shown in FIG. 4, a plurality of slots 31 that are formed in the radially inner surface of the stator core 30 and spaced in the circumferential direction of the stator core 30 at a predetermined pitch. For each of the slots 31, the depth-wise direction of the slot 31 is coincident with a radial direction of the stator core 30. In the present embodiment, there are provided two slots 31 per magnetic pole of the rotor that has the eight magnetic poles and per phase of the three-phase, stator coil 40. Accordingly, the total number of the slots 31 provided in the stator core 30 is equal to 48 (i.e., 2×8×3).

Figure 5:
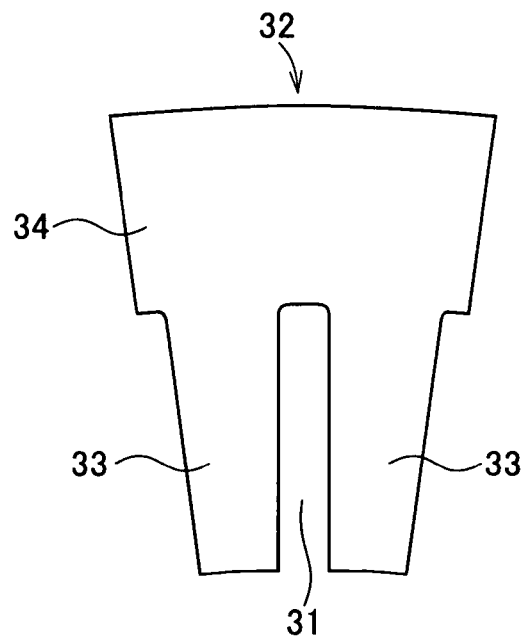
FIG. 5 is a top view of one of stator core segments which together make up the stator core.

Moreover, in the present embodiment, the stator core 30 is made up of, for example, 24 stator core segments 32 as shown in FIG. 5. The stator core segments 32 are joined together so as to adjoin one another in the circumferential direction of the stator core 30. Each of the stator core segments 32 defines therein one of the slots 31. Further, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is located radially outward of the tooth portions 33 to connect them. In addition, on the radially outer surfaces of the stator core segments 32, there is fitted a cylindrical outer rim 37 (see FIGS. 1-3).

In the present embodiment, each of the stator core segments 32 is formed by laminating a plurality of magnetic steel sheets with a plurality of insulating films interposed therebetween. It should be noted that other conventional metal sheets may also be used instead of the magnetic steel sheets.

Figure 13A:
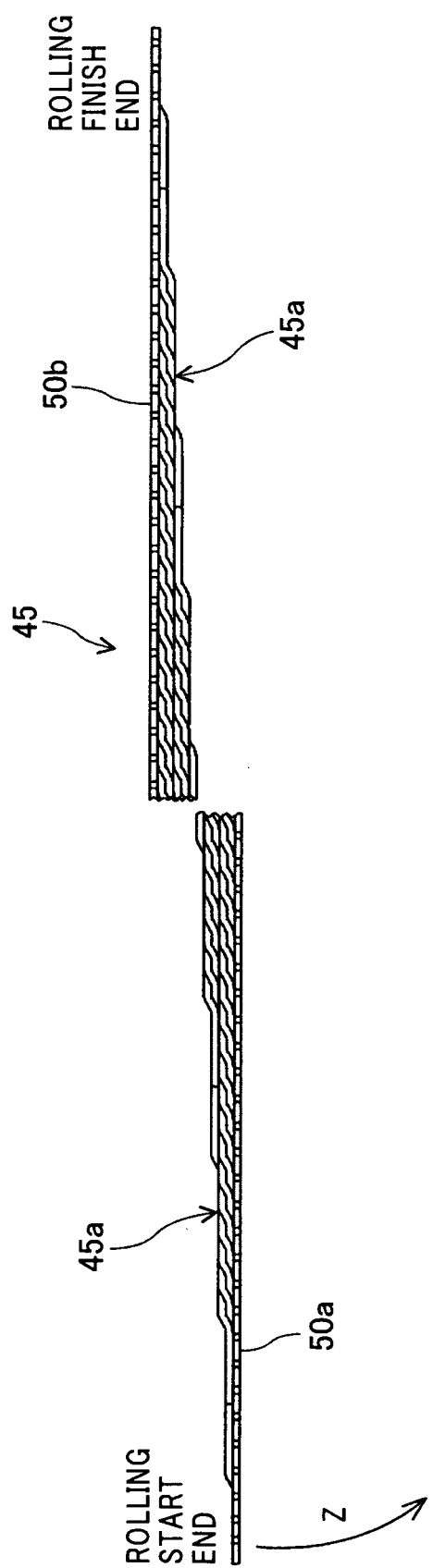
FIG. 13A is a bottom view of an electric wire assembly comprised of the electric wires for forming the stator coil.

FIGS. 6-9 together show the configuration of the stator coil 40. In the present embodiment, as to be described later, the stator coil 40 is produced by first stacking the 48 electric wires 50 to form a band-shaped electric wire assembly 45 as shown in FIGS. 13A-13B and then rolling the electric wire assembly 45 into a hollow cylindrical shape.

As shown in FIGS. 6-9, the stator coil 40 has, as a whole, a straight part 41 to be received in the slots 31 of the stator core 30, and a pair of coil end parts 42 that are respectively formed on opposite axial sides of the straight part 41 and to be located outside of the slots 31. Moreover, on one axial side of the straight part 41, U-phase, V-phase, and W-phase output terminals and U-phase, V-phase, and W-phase neutral terminals of the stator coil 40 protrude from the axial end face of the coil end part 42, and a plurality of crossover parts 70 of the electric wires 50 cross over the axial end face from the radially inner side to the radially outer side of the coil end part 42 to connect corresponding pairs of the electric wires 50.

Figure 10A:
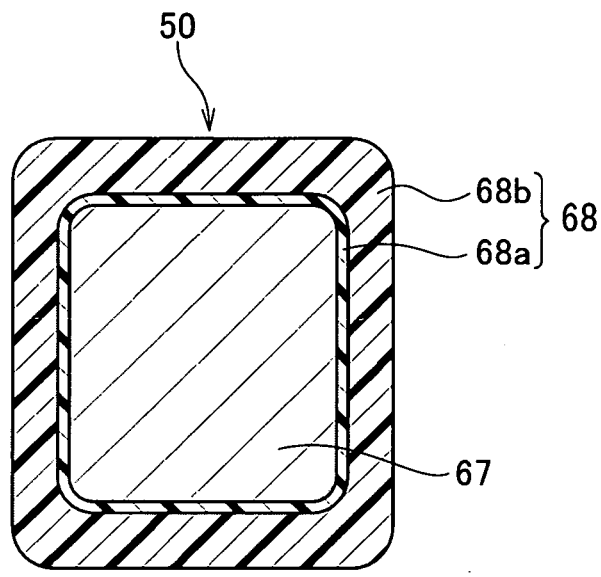
FIG. 10A is a cross-sectional view illustrating the configuration of electric wires forming the stator coil.

Each of the electric wires 50 for forming the stator coil 40 is configured with, as shown in FIG. 10A, an electric conductor 67 and an insulating coat 68 that covers the outer surface of the electric conductor 67. In the present embodiment, the electric conductor 67 is made of copper and has a substantially rectangular cross section. The insulating coat 68 is two-layer structured to include an inner layer 68a and an outer layer 68b. The thickness of the insulating coat 68 (i.e., the sum of thicknesses of the inner and outer layers 68a and 68b) is set to be in the range of 100 to 200 μm.

With such a large thickness of the two-layer structured insulating coat 68, it is possible to reliably insulate the electric wires 50 from one another without interposing insulating paper sheets therebetween. However, it is also possible to interpose insulating paper sheets between the electric wires 50 so as to further enhance the electrical insulation therebetween.

Further, the outer layer 68b is made of an insulating material such as nylon. The inner layer 68a is made of a thermoplastic resin having a higher glass transition temperature than the outer layer 68b or an insulating material having no glass transition temperature such as a polyamide-imide resin. Consequently, the outer layers 68b of the electric wires 50 will be solidified by the heat generated by operation of the electric rotating machine earlier than the inner layers 68a. As a result, the surface hardness of the outer layers 68b will be increased, thereby enhancing the electrical insulation between the electric wires 50.

Figure 10B:
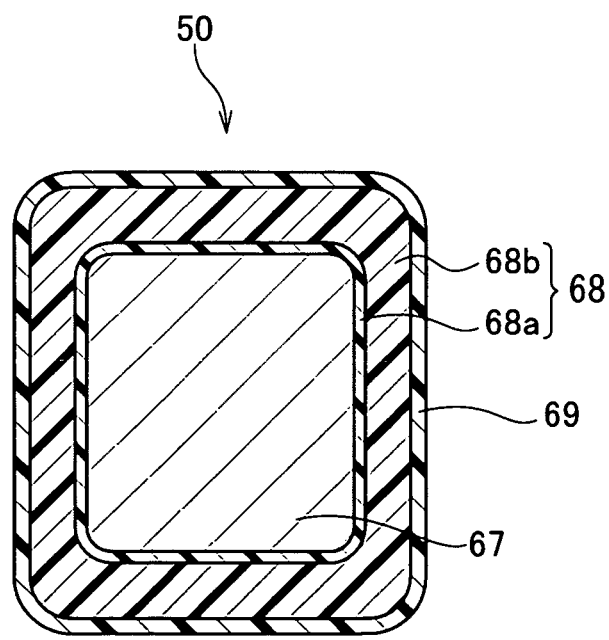
FIG. 10B is a cross-sectional view illustrating a modification of the configuration of the electric wires shown in FIG. 10A.

Furthermore, as shown in FIG. 10B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 68b of the insulating coats 68 of the electric wires 50 may also be made of PPS (polyphenylene sulfide).

Figure 11A:
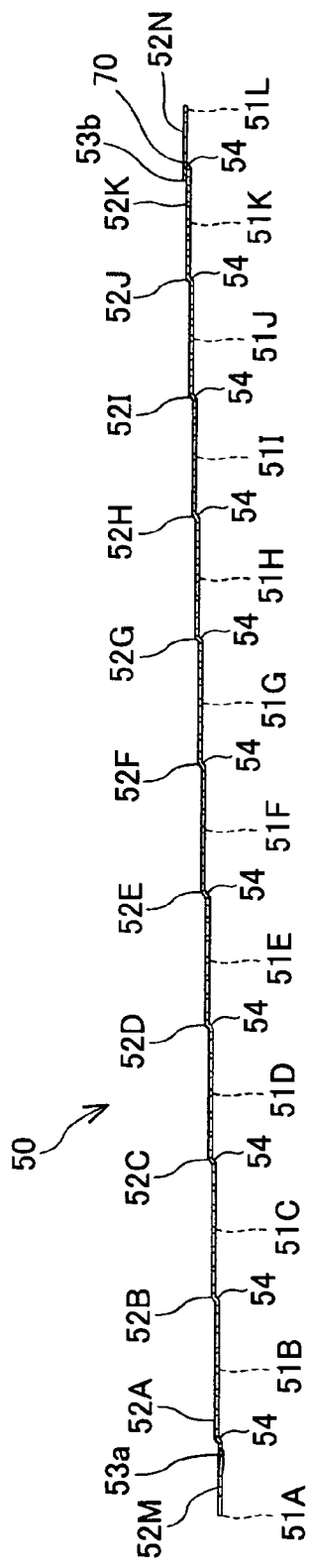
FIG. 11A is a top view of one of the electric wires.
Figure 11B:
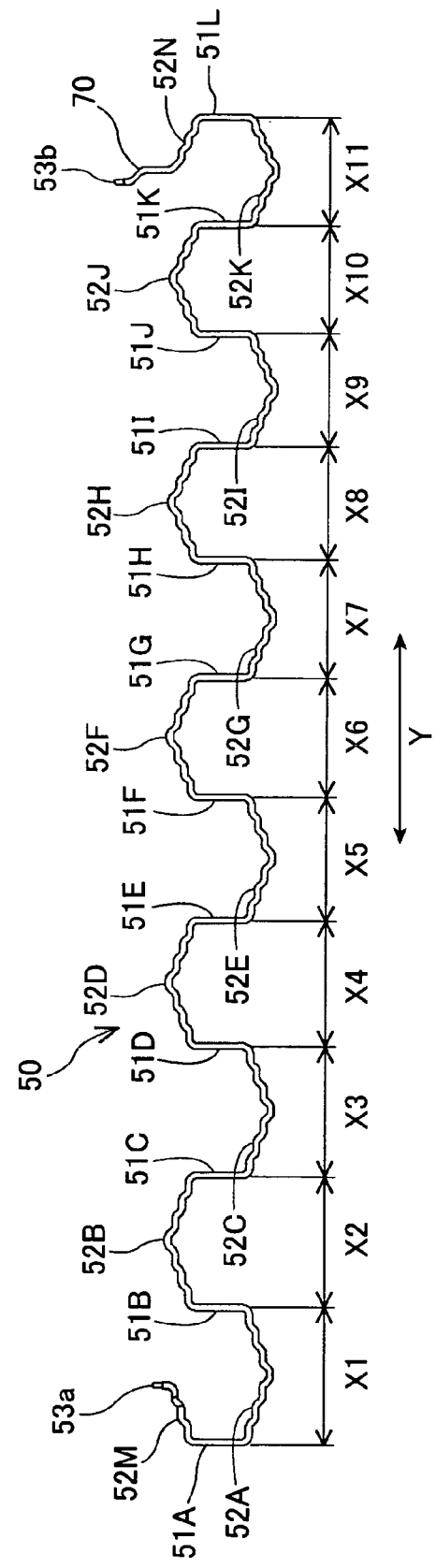
FIG. 11B is a front view of the one of the electric wires.

FIGS. 11A-11B together show the shape of each of the electric wires 50 before the electric wires 50 are stacked to form the band-shaped electric wire assembly 45.

As shown in FIGS. 11A-11B, each of the electric wires 50 is wave-shaped to include a plurality of in-slot portions 51 and a plurality of turn portions 52. The in-slot portions 51 are spaced in the longitudinal direction Y of the electric wire 50 at predetermined pitches and extend perpendicular to the longitudinal direction Y. Each of the in-slot portions 51 is to be received in a corresponding one of the slots 31 of the stator core 30. Each of the turn portions 52 extends to connect a corresponding adjacent pair of the in-slot portions 51 and is to be located outside of the slots 31 of the stator core 30.

Specifically, the plurality of in-slot portions 51 include, at least, a first in-slot portion 51A, a second in-slot portion 51B, and a third in-slot portion 51C. The first, second and third in-slot portions 51A, 51B, and 51C are to be respectively received in three different slots 31 of the stator core 30; the three slots 31 are circumferentially spaced at a pitch of six slots 31. On the other hand, the plurality of turn portions 52 include, at least, a first turn portion 52A and a second turn portion 52B. The first turn portion 52A connects the first and second in-slot portions 51A and 51B and is to be located on one axial side of the stator core 30 outside of the slots 31. The second turn portion 52B connects the second and third in-slot portions 51B and 51C and is to be located on the other axial side of the stator core 30 outside of the slots 31.

More specifically, in the present embodiment, as shown in FIGS. 11A-11B, the plurality of in-slot portions 51 include first to twelfth in-slot portions 51A-51L which are to be sequentially received in eight slots 31 that are circumferentially spaced at a pitch of six slots 31. In other words, the number of the in-slot portions 51 in each of the electric wires 50 is equal to 12. On the other hand, the plurality of turn portions 52 include first to eleventh turn portions 52A-52K which each connect a corresponding adjacent pair of the in-slot portions 51A-51L and are to be alternately located on the opposite axial sides of the stator core 30 outside of the slots 31. In other words, the number of the turn portions 52 in each of the electric wires 50 is equal to 11.

Moreover, the predetermined pitches X between the in-slot portions 51A-51L in the longitudinal direction Y of the electric wire 50 gradually decrease in a direction from the first in-slot portion 51A to the twelfth in-slot portion 51L. That is, $X1>X2>X3>X4>X5>X6>X7>X8>X9>X10>X11$. In addition, the predetermined pitches X1-X11 are set based on the circumferential distances between the eight slots 31 of the stator core 30 in which the in-slot portions 51A-51L are to be received.

Each of the electric wires 50 further includes a pair of lead portions 53a and 53b that are respectively formed at opposite ends of the electric wire 50 for connecting the electric wire 50 with other electric wires 50. The lead portion 53a is connected to the first in-slot portion 51A via a half-turn portion 52M that extends from the first in-slot portion 51A to return inward (i.e., rightward in FIG. 11B) in the longitudinal direction Y of the electric wire 50. The length of the half-turn portion 52M is substantially half the length of the first turn portion 52A. Consequently, the lead portion 53a is offset inward (i.e., rightward in FIG. 11B) in the longitudinal direction Y from the first in-slot portion 51A by the length of the half-turn portion 52M. On the other hand, the lead portion 53b is connected to the twelfth in-slot portion 51L via a half-turn portion 52N that extends from the twelfth in-slot portion 51L to return inward (i.e., leftward in FIG. 11B) in the longitudinal direction Y of the electric wire 50. The length of the half-turn portion 52N is substantially half the length of the eleventh turn portion 52K. Consequently, the lead portion 53b is offset inward (i.e., leftward in FIG. 11B) in the longitudinal direction Y from the twelfth in-slot portion 51L by the length of the half-turn portion 52N. Further, the lead portion 53b is formed to include therein one of the crossover parts 70 described previously.

Furthermore, as shown in FIG. 11A, each of the turn portions 52 includes, substantially at the center thereof, a crank-shaped part 54 that is bent to offset the turn portion 52 in a direction perpendicular to both the longitudinal direction Y of the electric wire 50 and the extending direction of the in-slot portions 51. Consequently, with the crank-shaped parts 54, the electric wire 50 is stepped to successively offset the in-slot portions 51 in the direction perpendicular to both the longitudinal direction Y and the extending direction of the in-slot portions 51. It should be noted that the term "crank-shaped" is used here only for the purpose of describing the overall shape of the parts 54 and does not restrict the internal angles between adjacent sections of the parts 54 to 90'.

Figure 12A:
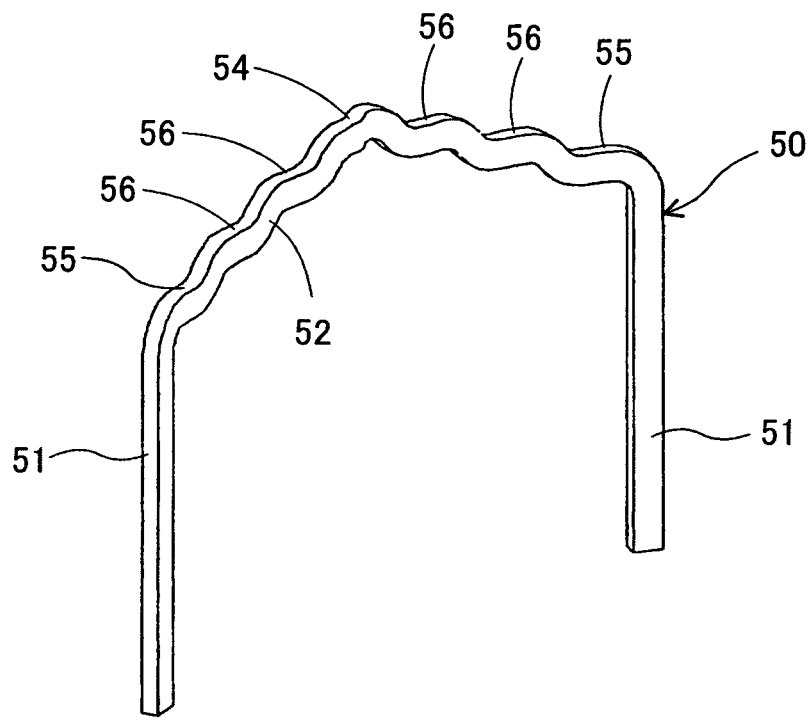
FIG. 12A is a perspective view illustrating a turn portion of one of the electric wires.
Figure 12B:
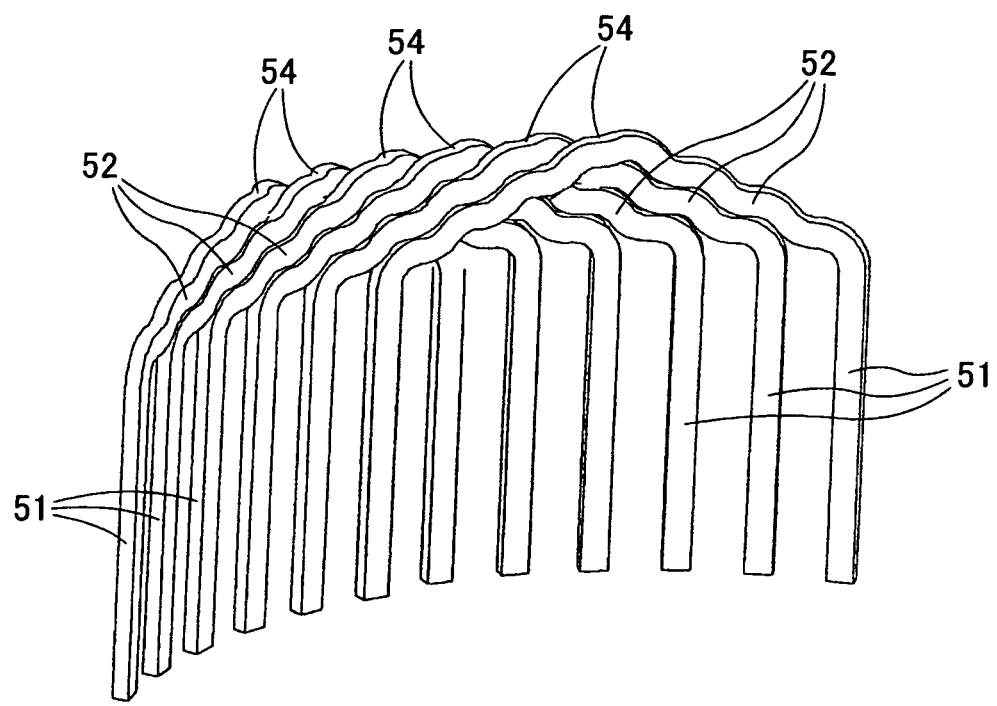
FIG. 12B is a perspective view illustrating a plurality of turn portions of the electric wires which are adjacent to one another.

Referring now to FIGS. 12A-12B, after forming the stator coil 40 with the electric wires 50 and assembling the stator core 30 to the stator coil 40, each of the turn portions 52 (i.e., 52A-52K) of the electric wires 50 is offset by the crank-shaped part 54 formed therein in a radial direction of the stator core 30. In addition, though not shown in FIGS. 12A-12B, each of the crank-shaped parts 54 formed in the turn portions 52 of the electric wires 50 extends parallel to a corresponding axial end face 30a of the stator core 30.

Further, in the present embodiment, the amount of radial offset made by each of the crank-shaped parts 54 is set to be equal to the radial thickness of the in-slot portions 51 of the electric wires 50. Here, the amount of radial offset made by each of the crank-shaped parts 54 is defined as the difference in radial position between the opposite ends of the crank-shaped part 54. Accordingly, for each of the electric wires 50, the difference in radial position between each adjacent pair of the in-slot portions 51, which are connected by a corresponding one of the turn portions 52, is equal to the radial thickness (i.e., thickness in the radial direction of the stator core 30) of the in-slot portions 51.

Setting the amount of radial offset as above, it is possible to arrange each adjacent pair of the turn portions 52 of the electric wires 50 in intimate contact with each other, as shown in FIG. 12B. As a result, the radial thickness of the coil end parts 42 of the stator coil 40 can be minimized. In addition, it is also possible to make each adjacent pair of the turn portions 52 of the electric wires 50 extend in the circumferential direction of the stator core 30 without interference therebetween.

Moreover, as shown in FIGS. 12A-123, each of the turn portions 52 of the electric wires 50 includes a pair of shoulder parts 55 which respectively adjoin the pair of the in-slot portions 51 connected by the turn portion 52 and both extend perpendicular to the pair of the in-slot portions 51 (or parallel to the corresponding axial end face 30a of the stator core 30). Consequently, with the shoulder parts 55, the protruding height of each of the turn portions 52 from the corresponding axial end face 30a of the stator core 30 can be reduced. As a result, the axial length of the coil end parts 42 of the stator coil 40 can be reduced. In addition, the coil end parts 42 of the stator coil 40 are each comprised of those of the turn portions 52 of the electric wires 50 which are located on the same axial side of the stator core 30.

Further, in the present embodiment, there is specified the following dimensional relationship: d1≤d2, where d1 is the length of each of the shoulder parts 55 of the electric wires 50 in the circumferential direction of the stator core 30 and d2 is the distance between each circumferentially-adjacent pair of the slots 31 of the stator core 30.

Specifying the above relationship, it is possible to prevent interference between each pair of the turn portions 52 of the electric wires 50 which respectively protrude from one circumferentially-adjacent pair of the slots 31 of the stator core 30. Consequently, it is possible to prevent both the axial length and radial thickness of the coil end parts 42 of the stator coil 40 from being increased for preventing the above-described interference.

Furthermore, as shown in FIGS. 12A-12B, each of the turn portions 52 of the electric wires 50 further includes two shoulder parts 56 between the crank-shaped part 54 and each of the shoulder parts 55. Accordingly, each of the turn portions 52 of the electric wires 50 includes one crank-shaped part 54, two shoulder parts 55, and four shoulder parts 56. Each of the shoulder parts 56 extends, like the shoulder parts 55, perpendicular to the in-slot portions 51 (or parallel to the corresponding axial end face 30a of the stator core 30). Consequently, with the shoulder parts 56, the protruding height of each of the turn portions 52 from the corresponding axial end face 30a of the stator core 30 can be further reduced. As a result, the axial length of the coil end parts 42 of the stator coil 40 can be further reduced.

In addition, each of the turn portions 52 of the electric wires 50 can be seen as being stepped on both sides of the crank-shaped part 54 to reduce its protruding height from the corresponding axial end face 30a of the stator core 30.

In the present embodiment, the stator coil 40 is formed with the 48 electric wires 50 as shown in FIGS. 11A-11B. It should be noted that the crossover parts 70 may be omitted from some of the electric wires 50 for facilitating the formation of the U-phase, V-phase, and W-phase output terminals and the U-phase, V-phase, and W-phase neutral terminals in the stator coil 40. However, in any case, it is preferable that all of the electric wires 50 have the same shape at least between the lead portions 53a and 53b.

In forming the stator coil 40, the 48 electric wires 50 are first stacked one by one so that the longitudinal directions Y of the electric wires 50 are parallel to each other and the first in-slot portions 51A of the electric wires 50 are offset from one another in the longitudinal directions Y by one slot pitch of the stator core 30 (i.e., the circumferential distance between the centers of each adjacent pair of the slots 31 of the stator core 30). Consequently, the band-shaped electric wire assembly 45 as shown in FIGS. 13A-138 is obtained. The assembly 45 has a pair of stepped surfaces 45a that are respectively formed at opposite longitudinal ends of the assembly 45 to face in opposite directions.

In addition, in FIG. 13A, the first electric wire 50 (to be denoted by 50a hereinafter) in the stacking of the electric wires 50 is located at the left end and the bottom of the electric wire assembly 45; the last electric wire 50 (to be denoted by 50b hereinafter) in the stacking of the electric wires 50 is located at the right end and the top of the assembly 45.

The band-shaped electric wire assembly 45 is then rolled to have the shape of a hollow cylinder with a constant radial thickness in the circumferential direction. More specifically, as shown in FIG. 13A, the band-shaped electric wire assembly 45 is rolled from the left end in the counterclockwise direction Z, bringing the two stepped surfaces 45a into complete contact with each other.

Consequently, as shown in FIG. 13C, each of the electric wires 50 included in the assembly 45 is rolled by one and a half turns into a spiral shape. Accordingly, in the finally-obtained stator 20, when viewed along the longitudinal axis O of the stator core 30, each of the electric wires 50 spirally extends around the axis O of the stator core 30 (see FIG. 16).

Thereafter, corresponding pairs of the lead portions 53a and 53b of the electric wires 50 are joined together by, for example, welding. As a result, the stator coil 40 as shown in FIGS. 6-9 is obtained.

In the stator coil 40, those of the turn portions 52 of the electric wires 50 which are located most radially outward do not protrude radially outward from those of the in-slot portions 51 of the electric wires 50 which are located most radially outward in the slots 31 of the stator core 30. Consequently, the outside diameter of the coil end parts 42 of the stator coil 40 can be limited.

Figure 6:
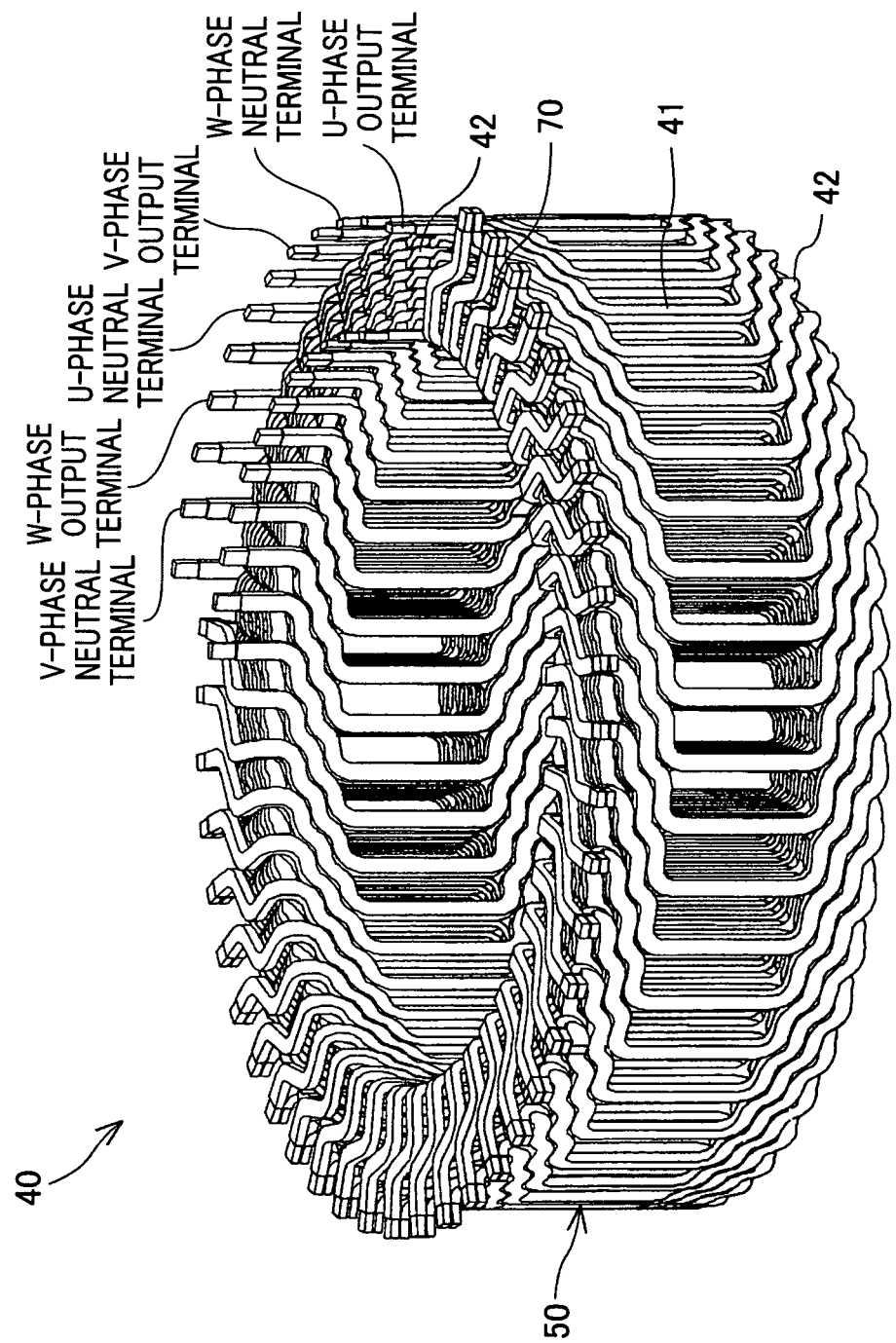
FIG. 6 is a perspective view of a stator coil of the stator.
Figure 7:
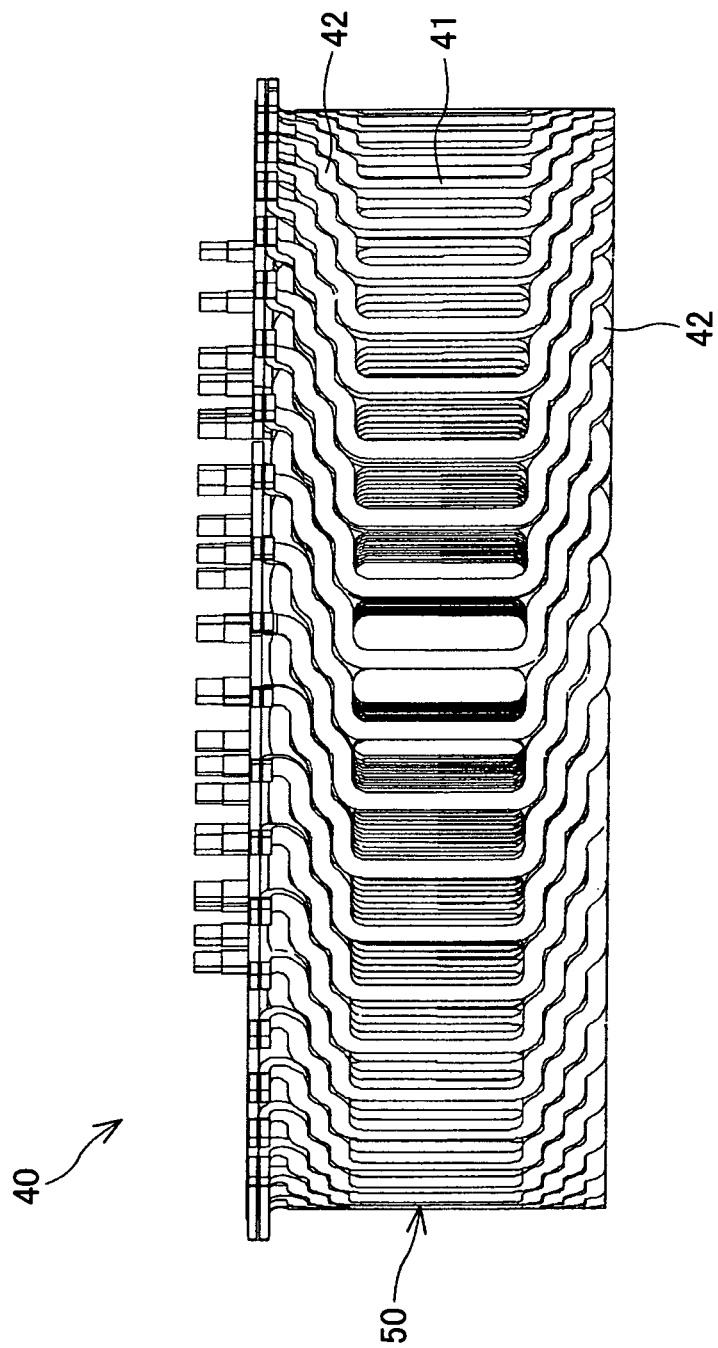
FIG. 7 is a side view of the stator coil.

As described previously, each of the turn portions 52 of the electric wires 50 includes, substantially at the center thereof, the crank-shaped part 54 by which the turn portion 52 is radially offset by the radial thickness of the in-slot portions 51. Accordingly, for each of the electric wires 50, the difference in radial position between each adjacent pair of the in-slot portions 51, which are connected by a corresponding one of the turn portions 52, is equal to the radial thickness of the in-slot portions 51. Moreover, for each of the electric wires 50, the first in-slot portion 51A is located most radially outward while the twelfth in-slot portion 51L is located most radially inward; the predetermined pitches X between the in-slot portions 51A-51L gradually decrease in a direction from the first in-slot portion 51A to the twelfth in-slot portion 51L (see FIG. 11B). Consequently, those of the in-slot portions 51 of the electric wires 50 which are stacked in a radial direction of the stator coil 40 (or a radial direction of the stator core 30) can be aligned straight in the radial direction, thereby allowing the stator coil 40 to have a substantially perfect hollow-cylindrical shape as shown in FIGS. 6 and 7.

Furthermore, all of the ith in-slot portions 51 of the 48 electric wires 50 are located respectively in the 48 slots 31 of the stator core 30 at the same radial position, where i=1, 2, . . . , 12. For example, all of the first in-slot portions 51A of the 48 electric wires 50 are located respectively in the 48 slots 31 and positioned most radially outward in the respective slots 31; all of the twelfth in-slot portions 51L of the 48 electric wires 50 are located respectively in the 48 slots 31 and positioned most radially inward in the respective slots 31. With the above location of the in-slot portions 51 of the electric wires 50, both the outside and inside diameters of the stator coil 40 can be made uniform in the circumferential direction of the stator core 30.

Figure 14:
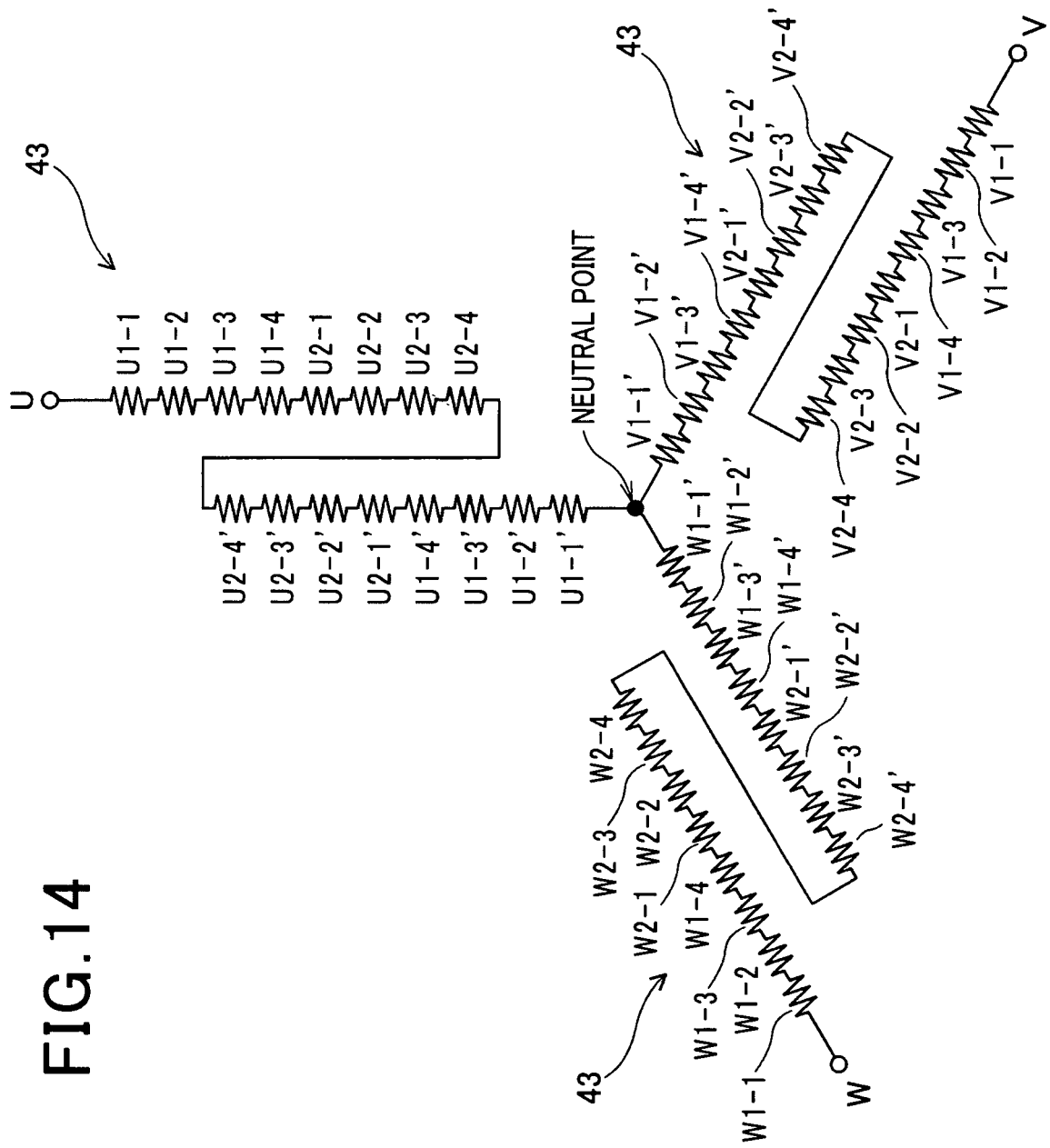
FIG. 14 is a circuit diagram of the stator coil.

In the present embodiment, as shown in FIG. 14, the stator coil 40 is formed as a three-phase coil which is comprised of three phase windings (i.e., U-phase, V-phase, and W-phase windings) 43. Each of the U-phase, V-phase, and W-phase windings 43 is formed by serially connecting 16 electric wires 50. Further, the U-phase output and neutral terminals are respectively formed at the opposite ends of the U-phase winding 43; the V-phase output and neutral terminals are respectively formed at the opposite ends of the V-phase winding 43; and the W-phase output and neutral terminals are respectively formed at the opposite ends of the W-phase winding 43. Furthermore, the U-phase, V-phase, and W-phase windings 43 are Y-connected to define a neutral point therebetween. That is, the U-phase, V-phase, and W-phase neutral terminals of the U-phase, V-phase, and W-phase windings 43 are joined together at the neutral point. Consequently, three-phase AC power is input to or output from the stator coil 40 via the U-phase, V-phase, and W-phase output terminals.

Figure 15:
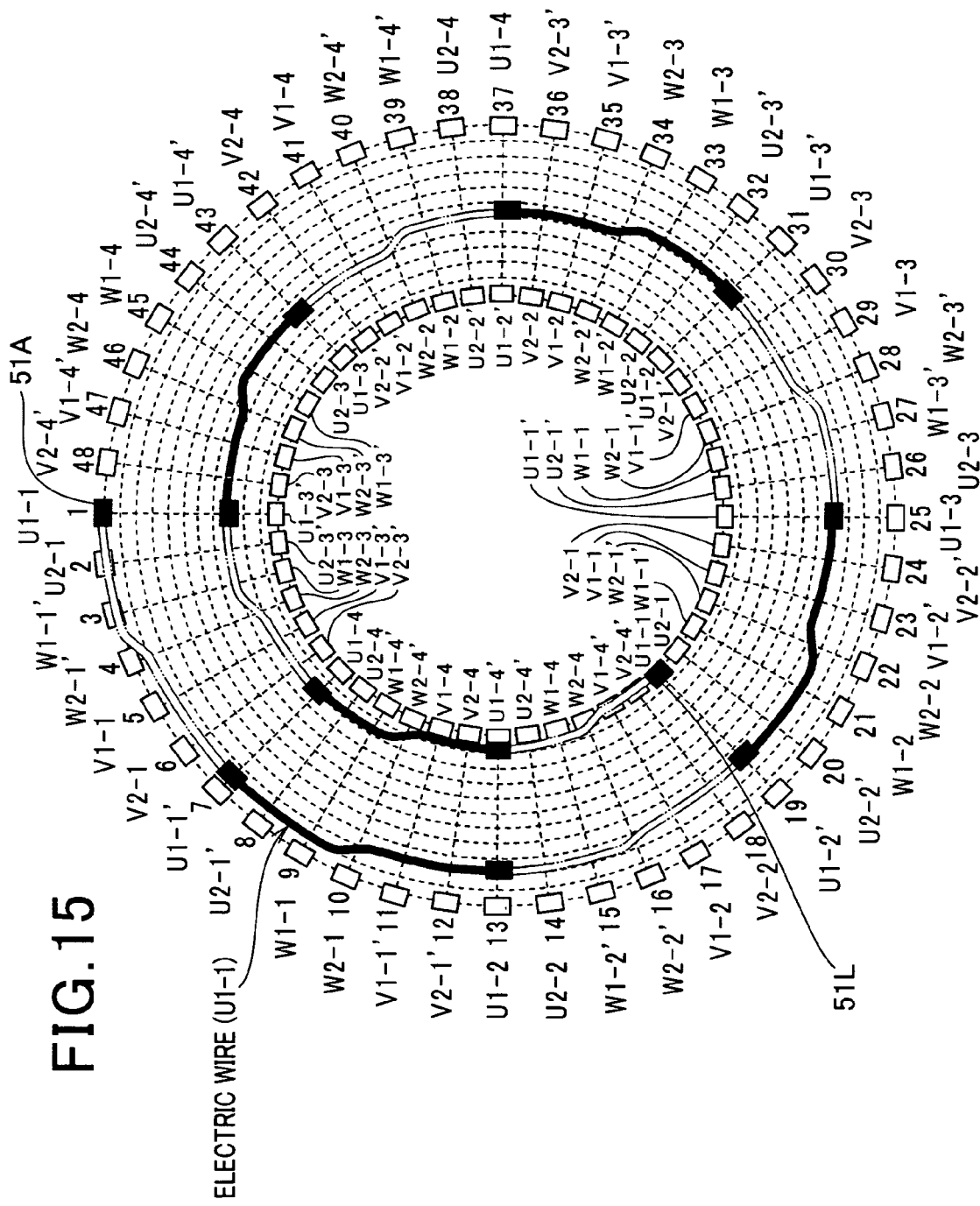
FIG. 15 is a schematic view illustrating the location of the radially-outermost in-slot portion of each of the electric wires in the stator core.
Figure 16:
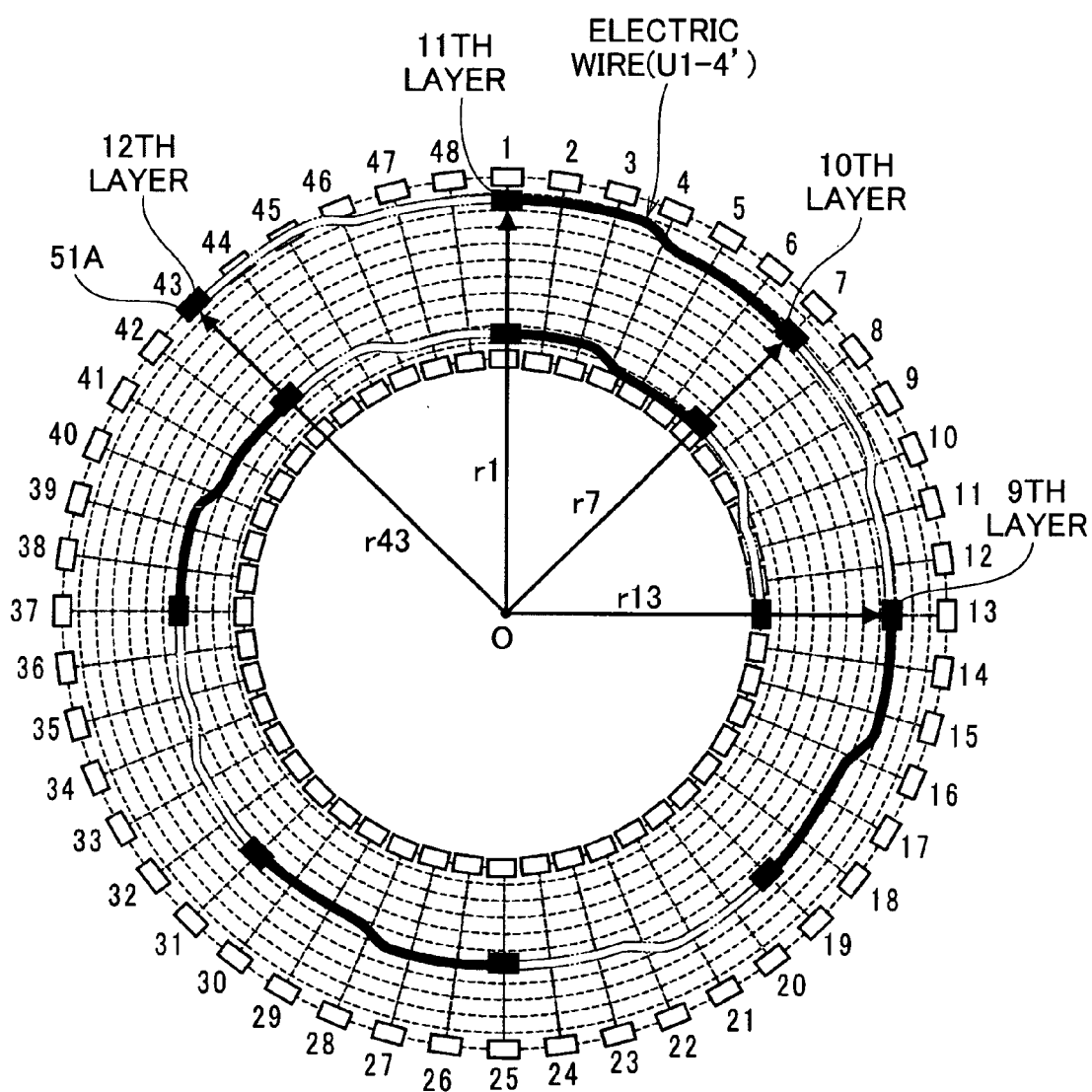
FIG. 16 is a schematic view illustrating the form of extension of the electric wire labeled (U1-4') when viewed along the longitudinal axis O of the stator core.

In FIGS. 15 and 16, the intersections between 12 dashed-line circles and 48 radially-extending dashed lines represent the positions of the in-slot portions 51 of the electric wires 50. In addition, among the positions of the in-slot portions 51, only the radially outermost and radially innermost ones are denoted by rectangles.

It can be seen from FIGS. 15 and 16 that in the present embodiment, in each of the slots 31 of the stator core 30, the in-slot portions 51 of the electric wires 50 are radially stacked in 12 layers.

Further, in FIGS. 15 and 16, the numbers 1-48 of the slots 31 of the stator core 30 are respectively shown radially outside of the 48 radially-extending dashed lines. In addition, in FIG. 15, each of the 48 electric wires 50 is labeled radially outside of the slot 31 in which the first in-slot portion 51A of the electric wire 50 is located most radially outward (i.e., located at the twelfth layer in the slot 31); each of the 48 electric wires 50 is also labeled radially inside of the slot 31 in which the twelfth in-slot portion 51L of the electric wire 50 is located most radially inward (i.e., located at the first layer in the slot 31).

In the present embodiment, each of the U-phase, V-phase, and W-phase windings 43 of the stator coil 40 is formed with first and second electric wire groups each consisting of eight electric wires 50. The in-slot portions 51 of the electric wires 50 of the first group are received in eight common slots 31 of the stator core 30. Similarly, the in-slot portions 51 of the electric wires 50 of the second group are also received in another eight common slots 31 of the stator core 30. That is, the in-slot portions 51 of the electric wires 50 of the first group axe received in different slots 31 from the in-slot portions 51 of the electric wires 50 of the second group.

For example, the U-phase winding 43 is formed with a first electric wire group, which consists of the electric wires 50 labeled (U1-1) to (U1-4) and (U1-1') to (U1-4'), and a second electric wire group that consists of the electric wires 50 labeled (U2-1) to (U2-4) and (U2-1') to (U2-4'). The in-slot portions 51 of the (U1-1) to (U1-4) and (U1-1') to (U1-4) electric wires 50 are received in the Nos. 1, 7, 13, 19, 25, 31, 37, and 43 slots 31 of the stator core 30. On the other hand, the in-slot portions 51 of the (U2-1) to (U2-4) and (U2-1') to (U2-4') electric wires 50 are received in the Nos. 2, 8, 14, 20, 26, 32, 38, and 44 slots 31 of the stator core 30.

FIG. 15 illustrates, from one axial side of the stator core 30, the arrangement of each of the 48 electric wires 50 by taking the (U1-1) electric wire 50 as an example. Specifically, in FIG. 15, the positions of the in-slot portions 51 of the (U1-1) electric wire 50 are denoted by black rectangles; those of the turn portions 52 of the (U1-1) electric wire 50 which are located on the one axial side of the stator core 30 on the front side of the paper surface of FIG. 15) are denoted by circumferentially-extending heavy lines; and those of the turn portions 52 of the (U1-1) electric wire 50 which are located on the other axial side of the stator core 30 (i.e., on the rear side of the paper surface of FIG. 15) are denoted by circumferentially-extending two-dot dashed lines. As seen from FIG. 15, for the (U1-1) electric wire 50, the first in-slot portion 51A is located at the twelfth layer (i.e., the radially outermost layer) in the No. 1 slot 31; the twelfth in-slot portion 51L is located at the first layer (i.e., the radially innermost layer) in the No. 19 slot 31; the first to the twelfth in-slot portions 51A-51L are circumferentially spaced at a six-slot pitch; and the radial positions of the in-slot portions 51A-51L are successively offset radially inward by one layer each time.

FIG. 16 illustrates, from the other axial side of the stator core 30, the arrangement of each of the 48 electric wires 50 by taking the (U1-4') electric wire 50 as an example. Specifically, in FIG. 16, the positions of the in-slot portions 51 of the (U1-4') electric wire 50 are denoted by black rectangles; those of the turn portions 52 of the (U1-4') electric wire 50 which are located on the other axial side of the stator core 30 (i.e., on the front side of the paper surface of FIG. 16) are denoted by circumferentially-extending heavy lines; and those of the turn portions 52 of the (U1-4') electric wire 50 which are located on the one axial side of the stator core 30 (i.e., on the rear side of the paper surface of FIG. 16) are denoted by circumferentially-extending two-dot dashed lines. As seen from FIG. 16, for the (U1-4') electric wire 50, the first in-slot portion 51A is located at the twelfth layer in the No. 43 slot 31; the twelfth in-slot portion 51L is located at the first layer in the No. 13 slot 31; the first to the twelfth in-slot portions 51A-51L are circumferentially spaced at a six-slot pitch; and the radial positions of the in-slot portions 51A-51L are successively offset by one layer each time.

As described previously, in the present embodiment, the stator core 30 has the 48 slots 31 formed therein, while the stator coil 40 is formed with the 48 electric wires 50. The electric wires 50 are mounted on the stator core 30 so that they are offset from one another in the circumferential direction of the stator core 30 by one slot pitch of the stator core 30. Consequently, the first in-slot portions 51A of the 48 electric wires 50 are respectively located at the radially outermost layers (i.e., the twelfth layers) in the 48 slots 31; the twelfth in-slot portions 51L of the 48 electric wires 50 are respectively located at the radially innermost layers (i.e., the first layers) in the 48 slots 31.

FIG. 17 shows both the label of the electric wire 50 located at the radially outermost layer and the label of the electric wire 50 located at the radially innermost layer in each of the slots 31 of the stator core 30.

In the present embodiment, for each of the 48 electric wires 50 forming the stator coil 40, the radial distances from the axis O of the stator core 30 to the in-slot portions 51 of the electric wire 50 successively decrease in the sequence from the first in-slot portion 51A to the twelfth in-slot portion 51L. Moreover, for each of the 48 electric wires 50, the difference in radial distance from the axis O of the stator core 30 between each adjacent pair of the in-slot portions 51, which are connected by a corresponding one of the turn portions 52, is equal to the radial thickness of the in-slot portions 51.

For example, referring back to FIG. 16, for the (U1-4') electric wire 50, there is satisfied the following relationship: r43>r1>r7>r13. Here, r43 represents the radial distance from the axis O of the stator core 30 to the first in-slot portion 51A that is located at the twelfth layer in the No. 43 slot 31; r1 represents the radial distance from the axis O to the second in-slot portion 51B that is located at the eleventh layer in the No. 1 slot 31; r7 represents the radial distance from the axis O to the third in-slot portion 51C that is located at the tenth layer in the No. 7 slot 31; and r13 represents the radial distance from the axis O to the fourth in-slot portion 51D that is located at the ninth layer in the No. 13 slot 31. Further, the radial distances r43, r1, r7, and r13 successively decrease in decrements of the radial thickness of the in-slot portions 51.

Figure 18:
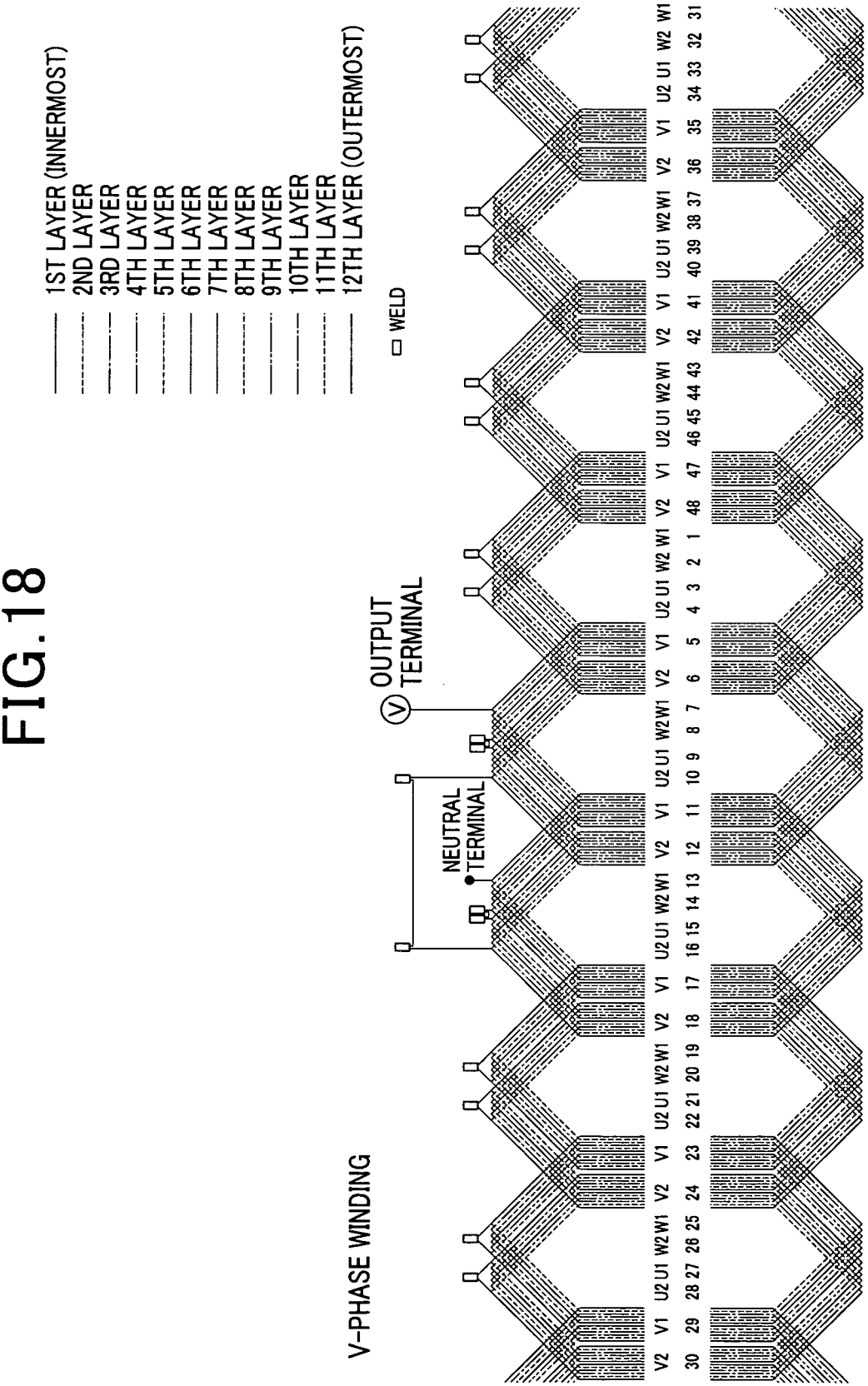
FIG. 18 is a schematic view illustrating the connection between those of the electric wires which together form a V-phase winding of the stator coil when viewed from the radially inner side of the stator core.

Next, with reference to FIGS. 14 and 17-18, the manner of serially connecting the 16 electric wires 50 for forming the V-phase winding 43 of the stator coil 40 will be described. In addition, it should be noted that the electric wires 50 for forming the U-phase and W-phase windings 43 of the stator coil 40 are also connected in the same manner as those for forming the V-phase winding 43.

As shown in FIG. 14, the U-phase winding 43 is formed by serially connecting the (V1-1) to (V1-4), (V1-1') to (V1-V4'), (V2-1) to (V2-4), and (V2-1') to (V2-4') electric wires 50.

Specifically, to the U-phase output terminal, there is connected the first in-slot portion 51A-side end of the (V1-1) electric wire 50. Moreover, as shown in FIGS. 17 and 18, for the is (V1-1) electric wire 50, the first in-slot portion 51A is located at the radially outermost layer (i.e., the twelfth layer) in the No. 5 slot 31 of the stator core 30, while the twelfth in-slot portion 51L is located at the radially innermost layer (i.e., the first layer) in the No. 23 slot 31.

To the twelfth in-slot portion 51L-side end of the (V1-1) electric wire 50, there is connected the first in-slot portion 51A-side end of the (V1-2) electric wire 50. Moreover, for the (V1-2) electric wire 50, the first in-slot portion 51A is located at the radially outermost layer in the No. 17 slot 31, while the twelfth in-slot portion 51L is located at the radially innermost layer in the No. 35 slot 31.

To the twelfth in-slot portion 51L-side end of the (V1-2) electric wire 50, there is connected the first in-slot portion 51A-side end of the (V1-3) electric wire 50. Moreover, for the (V1-3) electric wire 50, the first in-slot portion 51A is located, at the radially outermost layer in the No. 29 slot 31, while the twelfth in-slot portion 51L is located at the radially innermost layer in the No. 47 slot 31.

To the twelfth in-slot portion 51L-side end of the (V1-3) electric wire 50, there is connected the first in-slot portion 51A-side end of the (V1-4) electric wire 50. Moreover, for the (V1-4) electric wire 50, the first in-slot portion 51A is located at the radially outermost layer in the No. 41 slot 31, while the twelfth in-slot portion 51L is located at the radially innermost layer in the No. 11 slot 31.

To the twelfth in-slot portion 51L-side end of the (V1-4) electric wire 50, there is connected the first in-slot portion 51A-side end of the (V2-1) electric wire 50. Moreover, for the (V2-1) electric wire 50, the first in-slot portion 51A is located at the radially outermost layer in the No. 6 slot 31, while the twelfth in-slot portion 51L is located at the radially innermost layer in the No. 24 slot 31.

To the twelfth in-slot portion 51L-side end of the (V2-1) electric wire 50, there is connected the first in-slot portion 51A-side end of the (V2-2) electric wire 50. Moreover, for the (V2-2) electric wire 50, the first in-slot portion 51A is located at the radially outermost layer in the No. 18 slot 31, while the twelfth in-slot portion 51L is located at the radially innermost layer in the No. 36 slot 31.

To the twelfth in-slot portion 511-side end of the (V2-2) electric wire 50, there is connected the first in-slot portion 51A-side end of the (V2-3) electric wire 50. Moreover, for the (V2-3) electric wire 50, the first in-slot portion 51A is located at the radially outermost layer in the No. 30 slot 31, while the twelfth in-slot portion 51L is located at the radially innermost layer in the No. 48 slot 31.

To the twelfth in-slot portion 51L-side end of the (V2-3) electric wire 50, there is connected the first in-slot portion 51A-side end of the (V2-4) electric wire 50. Moreover, for the (V2-4) electric wire 50, the first in-slot portion 51A is located at the radially outermost layer in the No. 42 slot 31, while the twelfth in-slot portion 51L is located at the radially innermost layer in the No. 12 slot 31.

To the twelfth in-slot portion 51L-side end of the (V2-4) electric wire 50, there is connected the twelfth in-slot portion 51L-side end of the (V2-4') electric wire 50. Moreover, for the (V2-4') electric wire 50, the first in-slot portion 51A is located at the radially outermost layer in the No. 48 slot 31, while the twelfth in-slot portion 51L is located at the radially innermost layer in the No. 18 slot 31.

To the first in-slot portion 51A-side end of the (V2-4') electric wire 50, there is connected the twelfth in-slot portion 51L-side end of the (V2-3') electric wire 50. Moreover, for the (V2-3') electric wire 50, the first in-slot portion 51A is located at the radially outermost layer in the No. 36 slot 31, while the twelfth in-slot portion 51L is located at the radially innermost layer in the No. 6 slot 31.

To the first in-slot portion 51A-side end of the (V2-3') electric wire 50, there is connected the twelfth in-slot portion 51L-side end of the (V2-2') electric wire 50. Moreover, for the (V2-2') electric wire 50, the first in-slot portion 51A is located at the radially outermost layer in the No. 24 slot 31, while the twelfth in-slot portion 51L is located at the radially innermost layer in the No. 42 slot 31.

To the first in-slot portion 51A-side end of the (V2-2') electric wire 50, there is connected the twelfth in-slot portion 51L-side end of the (V2-1') electric wire 50. Moreover, for the (V2-1') electric wire 50, the first in-slot portion 51A is located at the radially outermost layer in the No. 12 slot 31, while the twelfth in-slot portion 51L is located at the radially innermost layer in the No. 30 slot 31.

To the first in-slot portion 51A-side end of the (V2-1') electric wire 50, there is connected the twelfth in-slot portion 51L-side end of the (V1-4') electric wire 50. Moreover, for the (V1-4') electric wire 50, the first in-slot portion 51A is located at the radially outermost layer in the No. 47 slot 31, while the twelfth in-slot portion 51L is located at the radially innermost layer in the No. 17 slot 31.

To the first in-slot portion 51A-side end of the (V1-4') electric wire 50, there is connected the twelfth in-slot portion 51L-side end of the (V1-3') electric wire 50. Moreover, for the (V1-3') electric wire 50, the first in-slot portion 51A is located at the radially outermost layer in the No. 35 slot 31, while the twelfth in-slot portion 51L is located at the radially innermost layer in the No. 5 slot 31.

To the first in-slot portion 51A-side end of the (V1-3') electric wire 50, there is connected the twelfth in-slot portion 51L-side end of the (V1-2') electric wire 50. Moreover, for the (V1-2') electric wire 50, the first in-slot portion 51A is located at the radially outermost layer in the No. 23 slot 31, while the twelfth in-slot portion 51L is located at the radially innermost layer in the No. 41 slot 31.

To the first in-slot portion 51A-side end of the (V1-2') electric wire 50, there is connected the twelfth in-slot portion 51L-side end of the (V1-1') electric wire 50. Moreover, for the (V1-1') electric wire 50, the first in-slot portion 51A is located at the radially outermost layer in the No. 11 slot 31, while the twelfth in-slot portion 51L is located at the radially innermost layer in the No. 29 slot 31. In addition, the first in-slot portion 51A-side end of the (V1-1') electric wire 50 is connected to the V-phase neutral terminal of the stator coil 40.

Further, as described previously, each of the electric wires 50 has the lead portion 53a formed at the first in-slot portion 51A-side end thereof and the lead portion 53b formed at the twelfth in-slot portion 51L-side end thereof (see FIGS. 11A-11B). The lead portion 53a is connected to the first in-slot portion 51A via the half-turn portion 52M, and the lead portion 53b is connected to the twelfth in-slot portion 51L via the half-turn portion 52N. The lead portion 53b also has the crossover part 70 formed therein. In the present embodiment, the connection between the electric wires 50 is made by welding corresponding pairs of the lead portions 53a and 53b of the electric wires 50.

For example, the (V1-1) electric wire 50 has the first in-slot portion 51A located at the radially outermost layer in the No. 5 slot 31 of the stator core 30 and the twelfth in-slot portion 51L located at the radially innermost layer in the No. 23 slot 31. The lead portion 53b of the (V1-1) electric wire 50 is offset, by the length of the half-turn portion 52N in the circumferential direction of the stator core 30, from the No. 23 slot 31 to the vicinity of the No. 20 slot 31. On the other hand, the (V1-2) electric wire 50 has the first in-slot portion 51A located at the radially outermost layer in the No 17 slot 31 and the twelfth in-slot portion 51L located at the radially innermost layer in the No. 35 slot 31. The lead portion 53a of the (V1-2) electric wire 50 is offset, by the length of the half-turn poi Lion 52M in the circumferential direction of the stator core 30, from the No. 17 slot 31 to the vicinity of the No. 20 slot 31. Further, as shown in FIGS. 6-9, the lead portion 53b of the (V1-1) electric wire 50 is bent substantially at a right angle to extend from the radially inner periphery of the stator coil 40 to the lead portion 53a of the (V1-2) electric wire 50 which is located on the radially outer periphery of the stator coil 40; then, the lead portion 53b of the (V1-1) electric wire 50 is welded to the lead portion 53a of the (V1-2) electric wire 50. In other words, the twelfth in-slot portion 51L-side end of the (V1-1) electric wire 50 is joined to the first in-slot portion 51A-side end of the (V1-2) electric wire 50 by welding.

Moreover, in the present embodiment, all of the corresponding pairs of the lead portions 53a and 53b of the electric wires 50 are welded radially outside of the radially outermost turn portions 52 of the electric wires 50. To this end, each of the lead portions 53b of the electric wires 50 is configured to include the crossover part 70 that crosses over the axial end face of the stator coil 40 (more specifically, the axial end face of the coil end part 42 of the stator coil 40 which is comprised of the turn, portions 52 of the electric wires 50) from the radially inside to the radially outside of the turn portions 52 of the electric wire 50. Consequently, it is possible to reliably prevent the twelfth in-slot portions 51L of the electric wires 50, which are located most radially inward in the slots 31 of the stator core 30, from protruding radially inward. As a result, it is possible to reliably prevent the stator coil 40 from interfering with the rotor of the electric rotating machine which is located radially inside of the stator 20.

Figure 8:
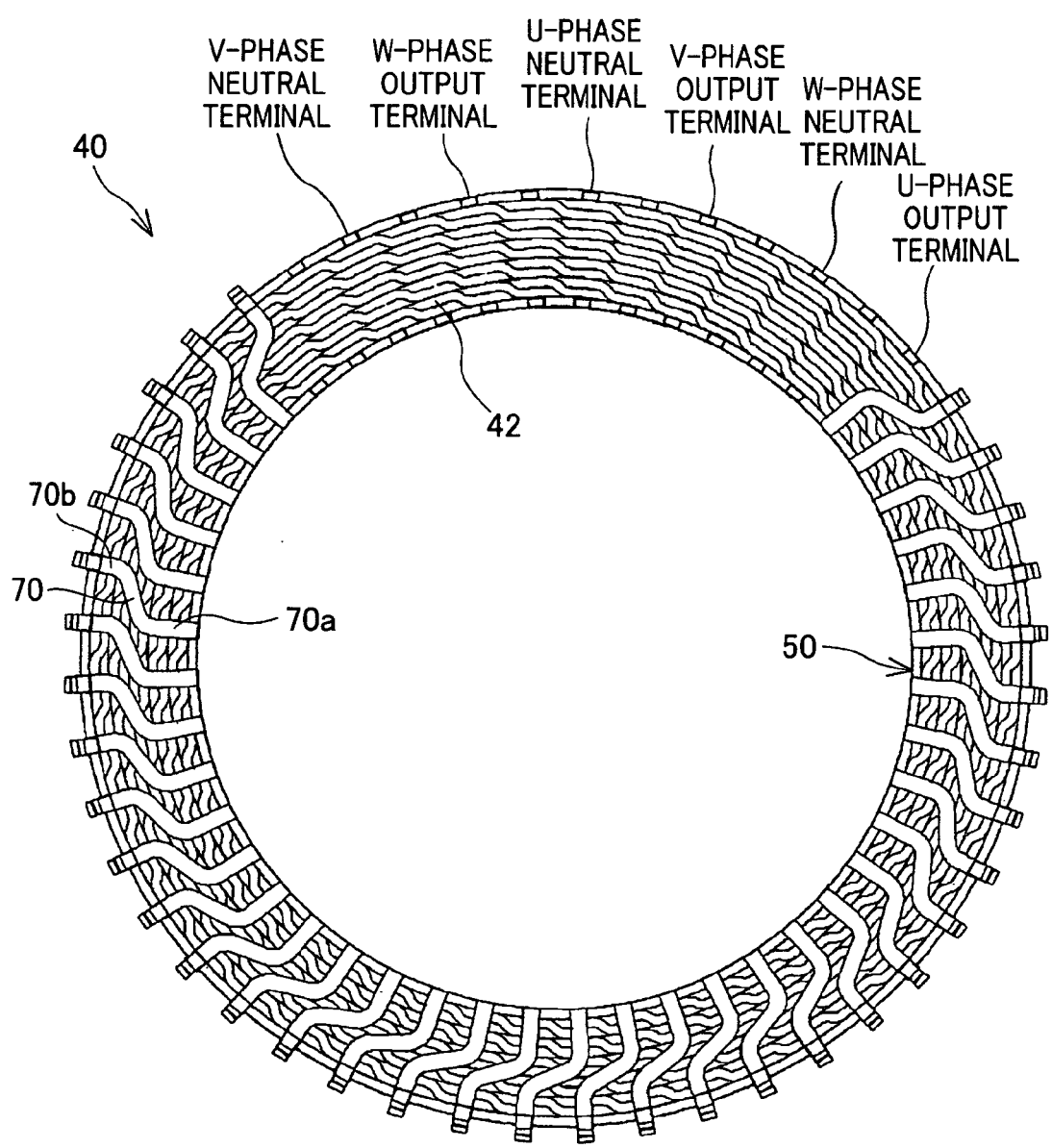
FIG. 8 is a top view of the stator coil.
Figure 9:
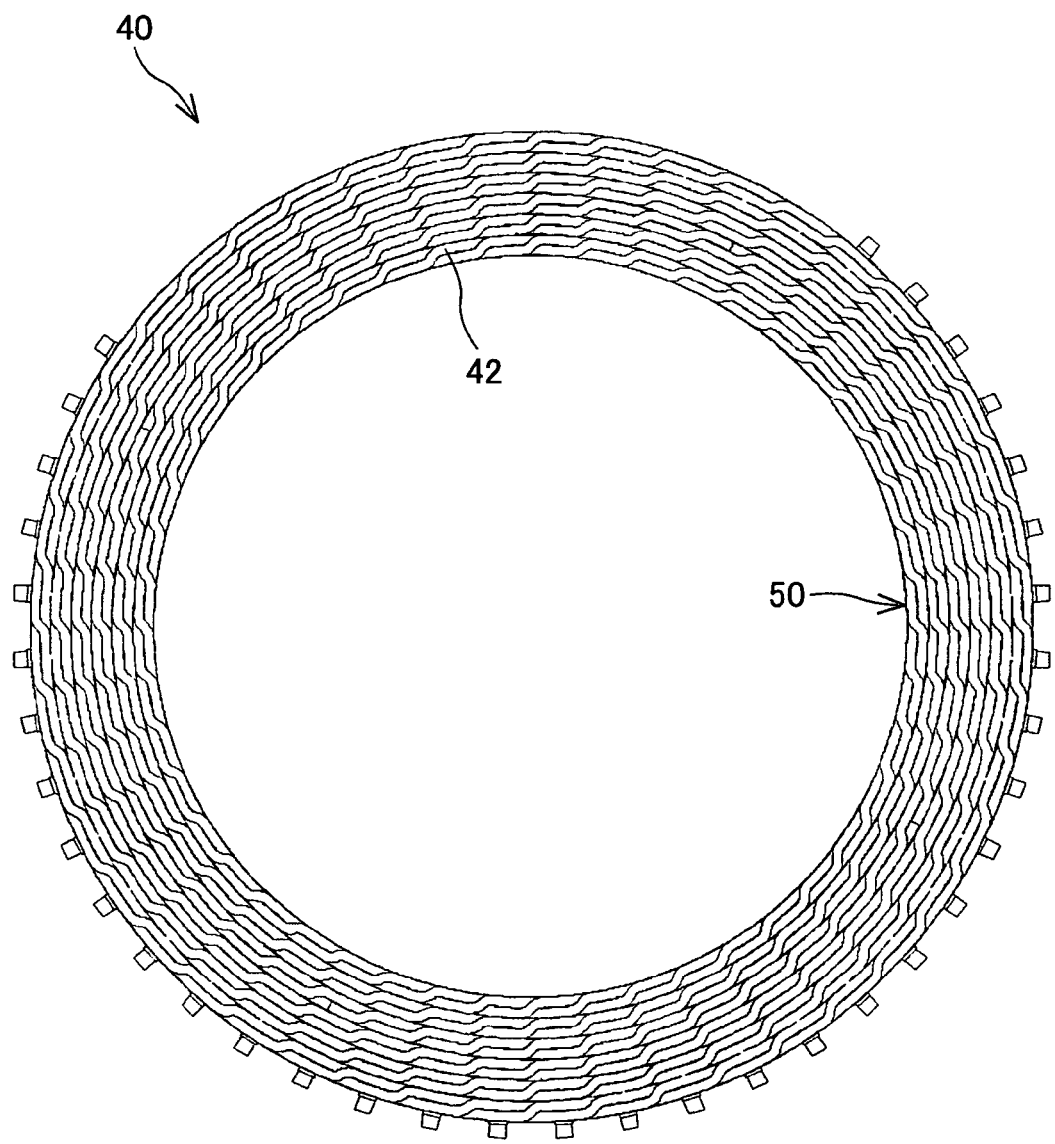
FIG. 9 is a bottom view of the stator coil.

Furthermore, in the present embodiment, as shown in FIG. 8, each of the crossover parts 70 of the electric wires 50 is crank-shaped to include a pair of radially-extending end sections 70a and 70b. With such a shape, it is possible to facilitate the bending of the lead portions 53b of the electric wires 50 for forming the crossover parts 70 and the welding of the corresponding pairs of the lead portions 53a and 53b of the electric wires 50.

In addition, as shown in FIGS. 6 and 8, on the axial end face of the stator coil 40, the crossover parts 70 occupy substantially ¾ of the full angular range of the annular axial end face; the full angular range is 360°. Further, within the remaining ¼ of the full angular range, there are sequentially arranged the V-phase neutral terminal, the W-phase output terminal, the U-phase neutral terminal, the V-phase output terminal, the W-phase neutral terminal, and the U-phase output terminal of the stator coil 40. That is, on the axial end face of the stator coil 40, the U-phase, V-phase, and W-phase output terminals are located in the same area as the U-phase, V-phase, and W-phase neutral terminals; the crossover parts 70 are located in a different area from the U-phase, V-phase, and W-phase output terminals and the U-phase, V-phase, and W-phase neutral terminals.

The stator core 30 is assembled to the above-described stator coil 40 by inserting the tooth portions 33 of the stator core segments 32 into the spaces formed between the stacks of the in-slot portions 51 of the electric wires 50 from the radially outside of the stator coil 40. Consequently, each of the in-slot portions 51 of the electric wires 50 forming the stator coil 40 is received in a corresponding one of the slots 31 of the stator core 30. More specifically, for each of the electric wires 50, each adjacent pair of the in-slot portions 51 are respectively received in a corresponding pair of the slots 31 of the stator core 30 which are circumferentially spaced at a six-slot pitch. Moreover, each of the turn portions 52, which connects a corresponding pair of the in-slot portions 51, protrudes from a corresponding one of the axial end faces of the stator core 30.

The above-described stator 20 according to the present embodiment has the following advantages.

In the present embodiment, the stator 20 includes the hollow cylindrical stator core 30 and the stator coil 40. The stator core 30 has the longitudinal axis O and the 48 slots 31 that are formed in the radially inner surface of the stator core 30 and spaced in the circumferential direction of the stator core 30 at a predetermined pitch. The stator coil 40 is comprised of the 48 electric wires 50 mounted on the stator core 30. Each of the electric wires 50 has at least the first to the third in-slot portions 51A-51C, and more particularly the first to the twelfth in-slot portions 51A-51L in the present embodiment. The twelve (i.e., n=12) in-slot portions 51A-51L are sequentially received in eight (i.e., p=8, p being an integer not greater than n) slots 31 of the stator core 30. Each of the electric wires 50 also has at least the first and second turn portions 52A and 52B, and more particularly the first to the eleventh turn portions 52A-52K. The eleven (i.e., (n−1)=11) turn portions 52A-52K are alternately located on the opposite axial sides of the stator core 30 outside of the slots 31 to connect corresponding adjacent pairs of the first to the twelfth in-slot portions 51A-51L. Further, for each of the electric wires 50, the radial distances of the first to the twelfth in-slot portions 51A-51L from the axis O of the stator core 30 successively decrease. The 48 electric wires 50 are offset from one another in the circumferential direction of the stator core 30 by one slot pitch of the stator core 30.

With the above configuration, it is possible to form the stator coil 40 by first stacking the electric wires 50 to form the band-shaped electric wire assembly 45 and then rolling the assembly 45 into a hollow cylindrical shape. That is, the stator coil 40 can be formed without performing a process of interlacing the electric wires 50 as disclosed in Japanese Unexamined Patent Application Publication No. 2004-104841. Consequently, it is possible to reduce both the manufacturing time and cost of the stator coil 40. Accordingly, it is possible to mass-produce stators 20 at low cost.

Further, in the present embodiment, for the electric wires 50 forming the stator coil 40, the first in-slot portions 51A are located most radially outward and the twelfth in-slot portions 51L are located most radially inward in the slots 31 of the stator core 30.

With the above configuration, the opposite ends of each of the electric wires 50 can be respectively located on the radially inner and radially outer peripheries of the stator core 30, thereby facilitating the process of connecting the electric wires 50.

In the present embodiment, in each of the slots 31 of the stator core 30, the in-slot portions 51 of the electric wires 50 are radially stacked in 12 layers. That is, the number of the in-slot portions 51 of the electric wires 50 radially stacked in each of the slots 31 of the stator core 30 is equal to the number of the in-slot portions 51 provided in each of the electric wires 50.

With the above configuration, it is possible to arrange the first in-slot portions 51A most radially outward and the twelfth in-slot portions 51L most radially inward in the respective slots 31.

In the present embodiment, all of the in-slot portions 51 of the electric wires 50 forming the stator coil 40 have the same radial thickness. For each of the electric wires 50, the difference in radial distance from the axis O of the stator core 30 between each adjacent pair of the in-slot portions 51, which are connected by a corresponding one of the turn portions 52, is equal to the radial thickness of the in-slot portions 51.

With the above configuration, it is possible to densely arrange the in-slot portions 51 of the electric wires 50 in the slots 31 of the stator core 30 without radial gaps formed therebetween, thereby ensuring high space factors of the electric wires 50 in the slots 31.

In the present embodiment, all of the first in-slot portions 51A of the electric wires 50 forming the stator coil 40 are respectively received in circumferentially-adjacent different slots 31 of the stator core 30, and all of the radial distances from the axis O of the stator core 30 to the first in-slot portions 51A of the electric wires 50 are equal.

With the above configuration, the radial dimension of the stator coil 40 can be made uniform in the circumferential direction of the stator core 30.

Further, in the present embodiment, all of the ith portions 51 of the electric wires 50 are respectively received in circumferentially-adjacent different slots 31 of the stator core 30, and all of the radial distances from the axis O of the stator core 30 to the ith in-slot portions 51 of the electric wires 50 are equal, where i=1, 2, . . . , 12.

With the above configuration, both the outside and inside diameters of the stator coil 40 can be made uniform in the circumferential direction of the stator core 30.

In the present embodiment, the number of the electric wires 50 forming the stator coil 40 is equal to 48; the number of the slots 31 formed in the stator core 30 is also equal to 48. That is, the number of the electric wires 50 is equal to that of the slots 31.

With the above configuration, it is possible to regularly arrange the electric wires 50 in the stator core 30 so that they are offset from one another in the circumferential direction of the stator core 30 by one slot pitch of the stator core 30. Consequently, it is possible to form the stator coil 40 to have a substantially perfect hollow-cylindrical shape. In addition, with the substantially perfect hollow-cylindrical shape of the stator coil 40, it is possible to ensure a high performance of the electric rotating machine.

In the present embodiment, for each of the electric wires 50 forming the stator coil 40, each adjacent pair of the in-slot portions 51, which are connected by a corresponding one of the turn portions 52, are spaced in the circumferential direction of the stator core 30 at a pitch of six slots 31.

With the above configuration, it is possible to form the stator coil 40 to have a desired number of phases (i.e., three phases in the present embodiment).

In the present embodiment, for each of the electric wires 50 forming the stator coil 40, all of the circumferential distances between adjacent pairs of the in-slot portions 51 are different from each other, and more particularly successively decrease in a direction from the first in-slot portion 51A to the twelfth in-slot portion 51L.

With the above configuration, those of the in-slot portions 51 of the electric wires 50 which are received in the same slot 31 of the stator core 30 can be radially aligned without being circumferentially offset from one another. Consequently, it is possible to form the stator coil 40 to have a substantially perfect hollow-cylindrical shape. Moreover, it is also possible to prevent the turn portions 52 of the electric wires 50 from axially protruding or being axially recessed, thereby making the axial end faces of the coil end parts 42 even.

In the present embodiment, for each of the electric wires 50 forming the stator coil 40, the eight slots 31 of the stator core 30, in which the first to the twelfth in-slot portions 51A-51L of the electric wire 50 are sequentially received, are circumferentially spaced at a six-slot pitch.

With the above configuration, it is possible to form the stator coil 40 to have a desired number of phases (i.e., three phases in the present embodiment).

In the present embodiment, for the stator coil 40, each circumferentially-adjacent pair of the turn, portions 52 of the electric wires 50 have the same shape.

With the same shape, it is possible to prevent the turn portions 52 of the electric wires 50 from interfering with each other, thereby preventing the coil end parts 42 of the stator coil 40 from being enlarged due to interference between the turn portions 52.

In the present embodiment, among all of the turn portions 52 of the electric wires 50, the first turn portions 52A are located most radially outward. Among all of the in-slot portions 51 of the electric wires 50, the first in-slot portions 51A are located most radially outward. Further, the first turn portions 52A do not protrude radially outward from the first in-slot portions 51A.

With the above configuration, it is possible to limit the outside diameter of the coil end parts 42 of the stator coil 40.

In the present embodiment, each of the electric wires 50 forming the stator coil 40 is comprised of the electric conductor 67 having a substantially rectangular cross section and the insulating coat 68 covering the surface of the electric conductor 67.

With the substantially rectangular cross section, it is possible to densely arrange the in-slot portions 51 of the electric wires 50 in the slots 31 of the stator core 30 without radial gaps formed therebetween, thereby ensuring high space factors of the electric wires 50 in the slots 31. Moreover, it is also possible to densely arrange the turn portions 52 of the electric wires 50 without radial gaps formed therebetween, thereby minimizing the radial size of the coil end parts 42 of the stator coil 40.

In the present embodiment, the stator coil 40 is a three-phase stator coil which is comprised of the U-phase, V-phase, and W-phase windings 43. Each of the U-phase, V-phase, and W-phase windings 43 is farmed by connecting 16 electric wires 50.

With the above formation, it is possible to shorten the length of each of the electric wires 50 forming the stator coil 40, thereby facilitating the shaping and handling of the electric wires 50.

In the present embodiment, each of the electric wires 50 forming the stator coil 40 has the lead portions 53a and 53b formed respectively at the opposite ends of the electric wire 50. All of the electric wires 50 have the same shape at least between the lead portions 53a and 53b.

With the above configuration, it is possible to shape all of the electric wires 50 using the same shaping machine and simplify the process of shaping the electric wires 50, thereby reducing the manufacturing cost of the stator coil 40.

In the present embodiment, the stator coil 40 is so configured that when viewed along the axis O of the stator core 30, each of the electric wires 50 forming the stator coil 40 spirally extends around the axis O of the stator core 30.

With the above configuration, it is possible to densely arrange the electric wires 50 without increasing the radial dimension of the stator core 40.

After having described the stator 20 according to the present embodiment, a method of manufacturing the stator 20 will be described hereinafter.

In the present embodiment, the method of manufacturing the stator 20 includes an electric wire-shaping step, an electric wire assembly-forming step, a stator coil-forming step, and a stator-assembling step.

In the electric wire-shaping step, 48 straight electric wires are shaped, using a shaping machine (not shown), to form the 48 wave-shaped electric wires 50 as shown in FIGS. 11A-11B.

In the electric wire assembly-forming step, the 48 electric wires 50 are stacked one by one to form the band-shaped electric wire assembly 45 as shown in FIGS. 13A-13B.

In the stator coil-forming step, the band-shaped electric wire assembly 45 is rolled, around a cylindrical core member having a predetermined diameter (not shown), into a hollow cylindrical shape. Further, in this step, the corresponding pairs of the lead portions 53a and 53b of the electric wires 50 are joined together by welding. As a result, the stator coil 40 as shown in FIGS. 6-9 is obtained.

In the stator-assembling step, the stator core 30 is assembled to the stator coil 40. More specifically, in this step, the stator core segments 32 are mounted to the stator coil 40 so that the tooth portions 33 of the stator core segments 32 are respectively inserted into the spaces formed between the stacks of the in-slot portions 51 of the electric wires 50. Then, all of the back core portions 34 of the stator core segments 32 are joined to one another by, for example, welding. Thereafter, the cylindrical outer rim 37 is fitted onto the radially outer surfaces of the stator core segments 32. As a result, the stator 20 as shown in FIGS. 1-3 is obtained.

With the above manufacturing method according to the present embodiment, it is possible to form the stator coil 40 without performing a process of interlacing the electric wires 50 as disclosed in Japanese Unexamined Patent Application Publication No 2004-104841. Consequently, it is possible to reduce both the manufacturing time and cost of the stator coil 40. Accordingly, it is possible to mass-produce stators 20 at low cost.

In addition, in the present embodiment, for each of the electric wires 50, the lead portions 53a and 53b are respectively offset inward from the first and twelfth in-slot portions 51A and 51L by the lengths of the half-turn portions 52M and 52N. Consequently, the distances between the corresponding pairs of the lead portions 53a and 53b of the electric wires 50 are reduced, thereby facilitating the process of joining the corresponding pairs of the lead portions 53a and 53b.

While the above particular embodiment of the present invention has been shown and described, it will be understood by those skilled in the art that various modifications, changes, and improvements may be made without departing from the spirit of the invention.

For example, FIG. 19A illustrates a first modification of the electric wires 50. In this modification, the half-turn portions 52M and 52N are formed to extend outward in the longitudinal direction of the electric wire 50 respectively from the first and twelfth in-slot portions 51A and 51L. Consequently, the lead portions 53a and 53b are respectively offset outward in the longitudinal direction from the first and twelfth in-slot portions 51A and 511, by the lengths of the half-turn portions 52M and 52N.

FIG. 19B illustrates a second modification of the electric wires 50. In this modification, the half-turn portion 52M is formed to extend outward in the longitudinal direction of the electric wire 50 from the first in-slot portion 51A, whereas the half-turn portion 52N is formed to extend inward in the longitudinal direction from the twelfth in-slot portion 511. Consequently, the lead portion 53a is offset outward in the longitudinal direction from the first in-slot portion 51A by the length of the half-turn portion 52M, whereas the lead portion 53b is offset inward in the longitudinal direction from the twelfth in-slot portion 51L by the length of the half-turn portion 52N.

FIG. 20A illustrates a third modification of the electric wires 50. In this modification, the half-turn portion 52M is formed to extend inward in the longitudinal direction of the electric wire 50 from the first in-slot portion 51A, whereas the half-turn portion 52N is formed to extend outward in the longitudinal direction from the twelfth in-slot portion 51L. Consequently, the lead portion 53a is offset inward in the longitudinal direction from the first in-slot portion 51A by the length of the half-turn portion 52M, whereas the lead portion 53b is offset outward in the longitudinal direction from the twelfth in-slot portion 51L by the length of the half-turn portion 52N.

FIG. 20B illustrates a fourth modification of the electric wires 50. In this modification, both the half-turn portions 52M and 52N are omitted so that the lead portions 53a and 53b extend respectively from the first and twelfth in-slot portions 51A and 51L without being offset therefrom in the longitudinal direction of the electric wire 50.

Figure 21:
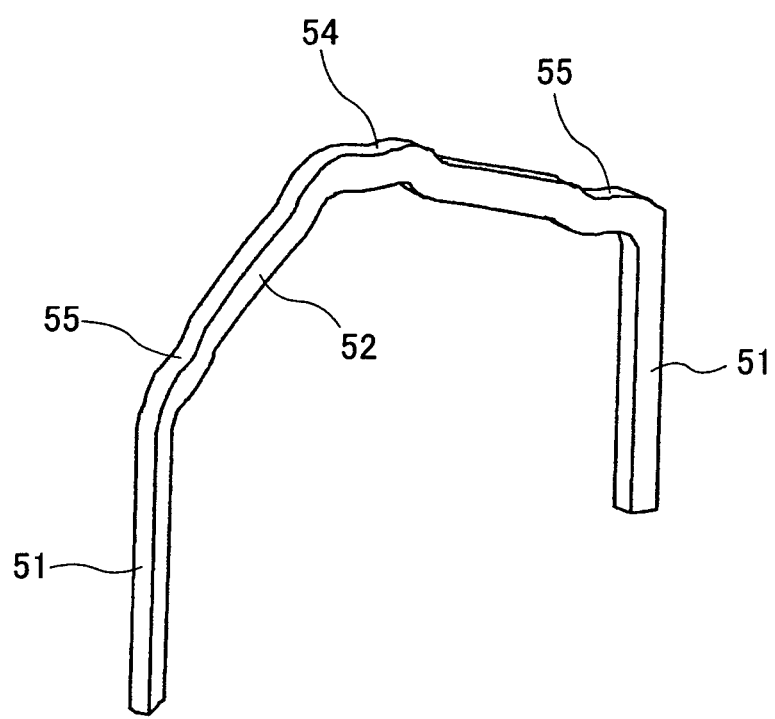
FIG. 21 is a perspective view illustrating a turn portion of an electric wire for forming the stator coil according to a fifth modification of the invention.

FIG. 21 illustrates a fifth modification of the electric wires 50. In this modification, the shoulder parts 56 as shown in FIG. 12A are omitted from each of the turn portions 52 of the electric wires 50. Consequently, those parts between the crank-shaped part 54 and the shoulder parts 55 in each of the turn portions 52 of the electric wires 50 become straight. As a result, the shape of the turn portions 52 of the electric wires 50 is simplified, thereby facilitating the shaping of the electric wires 50.

Figure 22A:
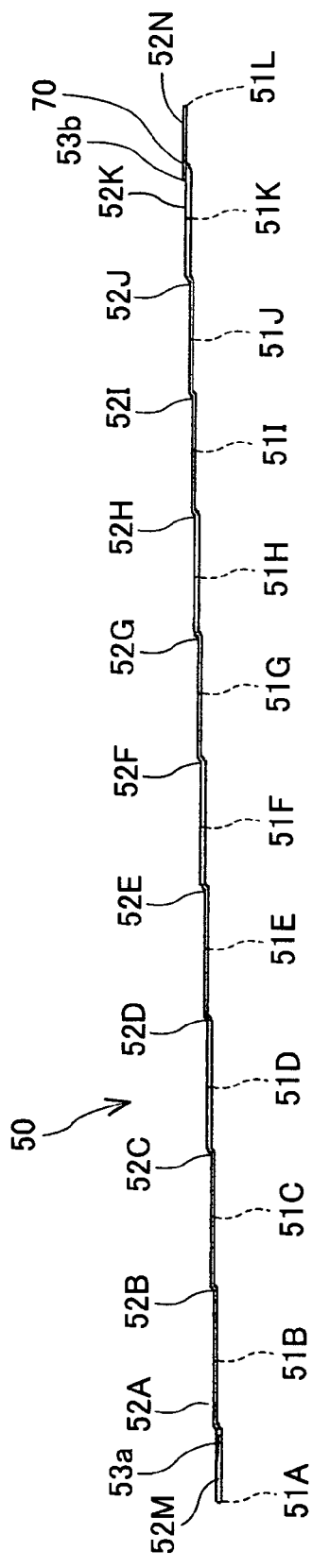
FIG. 22A is a top view of an electric wire for forming the stator coil according to a sixth modification of the invention.
Figure 22B:
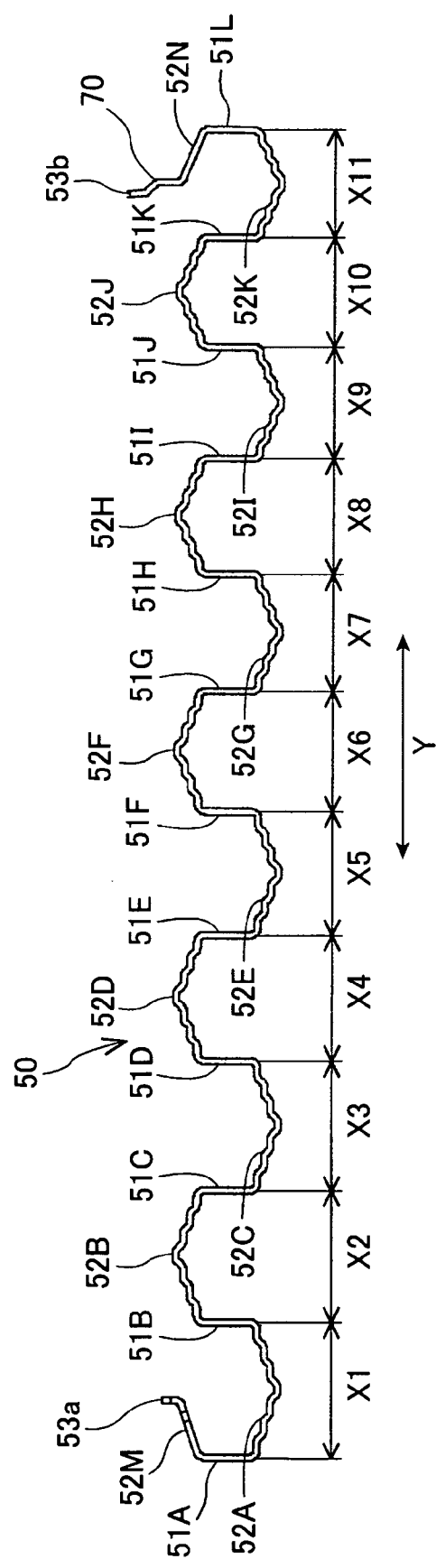
FIG. 22B is a front view of the electric wire according to the sixth modification.

FIGS. 22A-22B illustrate a sixth modification of the electric wires 50. In this modification, both the half-turn portions 52M and 52N are shaped straight without being stepped as shown in FIGS. 11A-11B. With the straight shape of the half-turn portions 52M and 52N, the lead portions 53a and 53b can be more easily and accurately positioned. In addition, it is also possible to shape only one of the half-turn portions 52M and 52N straight.

In the previous embodiment, each of the turn portions 52 of the electric wires 50 includes the crank-shaped part 54 that is formed substantially at the center of the turn portion 52 for radially offsetting a corresponding pair of the in-slot portions 51 connected by the turn portion 52. However, the crank-shaped part 54 is not necessarily formed substantially at the center of the turn portion 52. For example, the crank-shaped part 54 may be formed in the vicinity of one end of the turn portion 52.

In the previous embodiment, the amount of radial offset made by each of the crank-shaped parts 54 of the turn portions 52 is set to be equal to the radial thickness of the in-slot portions 51 of the electric wires 50. However, the amount of radial offset made by each of the crank-shaped parts 54 may also be set to be, for example, 0.5, 1.5, or 2 times the radial thickness of the in-slot portions 51. In such cases, the difference in radial distance from the axis O of the stator core 30 between each adjacent pair of the in-slot portions 51, which are connected by a corresponding one of the turn portions 52, would be accordingly 0.5, 1.5, or 2 times the radial thickness of the in-slot portions 51.

In the previous embodiment, n=12, where n is the number of in-slot portions 51 provided in each of the electric wires 50. However, n may also be equal to other integers not less than 3. In addition, it is preferable that n is an even number so as to locate the lead portions 53a and 53b of each of the electric wires 50 on the same axial side of the stator core 30.

In the previous embodiment, for each of the electric wires 50, the radial distances of the first to the twelfth in-slot portions 51A-51L from the axis O of the stator core 30 successively decrease in equal decrements (i.e., in the decrements equal to the radial thickness of the in-slot portions 51A-51L). However, each of the electric wires 50 may also be modified so that the radial distances of the first to the twelfth in-slot portions 51A-51L from the axis O of the stator core 30 successively decrease in different decrements.

In the previous embodiment, the first in-slot portions 51A of the electric wires 50 are located most radially outward in the corresponding slots 31 of the stator core 30. However, the first in-slot portions 51A may also not be located most radially outward in the corresponding slots 31.

In the previous embodiment, the twelfth in-slot portions 51L of the electric wires 50 are located most radially inward in the corresponding slots 31 of the stator core 30. However, the twelfth in-slot portions 51L may also not be located most radially inward in the corresponding slots 31.

In the previous embodiment, the number of the in-slot portions 51 of the electric wires 50 radially stacked in each of the slots 31 of the stator core 30 is set to be equal to the number of the in-slot portions 51 provided in each of the electric wires 50. However, the number of the in-slot portions 51 of the electric wires 50 radially stacked in each of the slots 31 of the stator core 30 may also be set to be different from the number of the in-slot portions 51 provided in each of the electric wires 50.

In the previous embodiment, all of the ith in-slot portions 51 of the electric wires 50 are respectively received in different slots 31 of the stator core 30 which are circumferentially adjacent (or consecutive) to one another, where i=1, 2, ..., 12. However, all of the ith in-slot portions 51 of the electric wires 50 may also be respectively received in different slots 31 which are not adjacent to one another.

In the previous embodiment, the number of the electric wires 50 forming the stator coil 40 is equal to the number of the slots 31 formed in the stator core 30. However, the number of the electric wires 50 forming the stator coil 40 may also be different from the number of the slots 31 formed in the stator core 30.

What is claimed is:

1. A stator for an electric rotating machine, the stator comprising:
    a hollow cylindrical stator core having a longitudinal axis and a plurality of slots that are formed in a radially inner surface of the stator core and spaced in a circumferential direction of the stator core; and
    a stator coil formed of a plurality of electric wires mounted on the stator core,
    wherein
    each of the electric wires forming the stator coil has only first, second, third, ..., nth sequential in-slot portions and only first, second, ..., (n−1)th sequential turn portions, where n is an integer not less than 4,
    the first to the nth in-slot portions are sequentially received in p of the slots of the stator core, where p is an integer not greater than n,
    the first to the (n−1)th turn portions are alternately located on opposite axial sides of the stator core outside of the slots to connect corresponding adjacent pairs of the first to the nth in-slot portions,
    all of the radial distances of the first to the nth in-slot portions from the axis of the stator core successively decrease,
    for all of the electric wires forming the stator coil, the first in-slot portions are located most radially outward and the nth in-slot portions are located most radially inward in the slots of the stator core, and all of the electric wires are offset from one another in the circumferential direction of the stator core.

2. The stator as set forth in claim 1, wherein, in each of the slots of the stator core, the in-slot portions of the electric wires are radially stacked in n layers.

3. The stator as set forth in claim 1, wherein all of the ith in-slot portions of the electric wires are respectively received in circumferentially-adjacent different ones of the slots of the stator core, and all of the radial distances from the axis of the stator core to the ith in-slot portions of the electric wires are equal, where i=1, 2, ..., n.

4. The stator as set forth in claim 3, wherein the number of the electric wires forming the stator coil is equal to the number of the slots formed in the stator core.

5. The stator as set forth in claim 1, wherein for each of the electric wires forming the stator coil, each adjacent pair of the in-slot portions, which are connected by a corresponding one of the turn portions, are spaced in the circumferential direction of the stator core at a pitch of a predetermined number of the slots of the stator core.

6. The stator as set forth in claim 5, wherein for each of the electric wires forming the stator coil, all of the circumferential distances between adjacent pairs of the in-slot portions of the electric wire are different from each other.

7. The stator as set forth in claim 6, wherein for each of the electric wires forming the stator coil, the circumferential distances between adjacent pairs of the in-slot portions of the electric wire successively decrease in a direction from the first in-slot portion to the nth in-slot portion.

8. The stator as set forth in claim 1, wherein for each of the electric wires forming the stator coil, the p slots of the stator core in which the first to the nth in-slot portions of the electric wire are sequentially received, are circumferentially spaced at a pitch of a predetermined number of the slots of the stator core.

9. The stator as set forth in claim 1, wherein all of the in-slot portions of the electric wires forming the stator coil have the same radial thickness, and for each of the electric wires, the difference in radial distance from the axis of the stator core between each adjacent pair of the in-slot portions, which are connected by a corresponding one of the turn portions, is equal to the radial thickness of the in-slot portions.

10. The stator as set forth in claim 1, wherein each circumferentially-adjacent pair of the turn portions of the electric wires have the same shape.

11. The stator as set forth in claim 1, wherein the first turn portions of the electric wires do not protrude radially outward from the first in-slot portions of the electric wires.

12. The stator as set forth in claim 1, wherein each of the electric wires forming the stator coil has an opposite pair of first and second ends, first and second lead portions formed respectively at the first and second ends, and first and second half-turn portions that are respectively formed between the first lead portion and the in-slot portion closest to the first end and between the second lead portion and the in-slot portion closest to the second end of the electric wire, and for each of the electric wires, at least one of the first and second half-turn portions of the electric wire is shaped straight.

13. The stator as set forth in claim 1, wherein each of the electric wires forming the stator coil is formed of an electric conductor having a substantially rectangular cross section and an insulating coat covering the surface of the electric conductor.

14. The stator as set forth in claim 1, wherein the stator coil is a multi-phase stator coil which is formed of a plurality of phase windings, and each of the phase windings of the stator coil is formed by connecting a predetermined number of the electric wires.

15. The stator as set forth in claim 1, wherein each of the electric wires forming the stator coil has an opposite pair of first and second ends, and first and second lead portions formed respectively at the first and second ends, and all of the electric wires have the same shape at least between the first and second lead portions.

16. The stator as set forth in claim 1, wherein when viewed along the axis of the stator core, each of the electric wires spirally extends around the axis of the stator core.

17. A method of manufacturing a stator for an electric rotating machine, wherein the stator comprises a hollow cylindrical stator core and a stator coil mounted on the stator core, and the stator core has a longitudinal axis and a plurality of slots that are formed in a radially inner surface of the stator core and spaced in a circumferential direction of the stator core, the method comprising the steps of:

shaping a plurality of electric wires into a wave shape so that each of the wave-shaped electric wires has only first, second, third, . . . , nth sequential in-slot portions and only first, second, . . . , (n−1)th sequential turn portions, where n is an integer not less than 4, the first to the nth in-slot portions are sequentially received in p of the slots of the stator core, where p is an integer not greater than n, the first to the (n−1)th turn portions are alternately located on opposite axial sides of the stator core outside of the slots to connect corresponding adjacent pairs of the first to the nth in-slot portions, all of the radial distances of the first to the nth in-slot portions from the axis of the stator core successively decrease, for all of the electric wires forming the stator coil, the first in-slot portions are located most radially outward and the nth in-slot portions are located most radially inward in the slots of the stator core, and all of the electric wires are offset from one another in the circumferential direction of the stator core;

stacking the wave-shaped electric wires one by one to form a band-shaped electric wire assembly;

rolling the band-shaped electric wire assembly into a hollow cylindrical shape to form the stator coil; and assembling the stator coil with the stator core to form the stator.

* * * * *